United States Patent

Taguchi et al.

Patent Number: 5,846,449
Date of Patent: Dec. 8, 1998

[54] MAGNET POWDER, SINTERED MAGNET, BONDED MAGNET, AND MAGNETIC RECORDING MEDIUM

[75] Inventors: Hitoshi Taguchi; Kenichiro Suwa; Taku Takeishi, all of Chiba, Japan

[73] Assignee: TDK Corporation, Tokyo, Japan

[21] Appl. No.: 672,848

[22] Filed: Jul. 25, 1996

[30] Foreign Application Priority Data

Aug. 11, 1995 [JP] Japan .................................. 7-227183
May 15, 1996 [JP] Japan .................................. 8-145006

[51] Int. Cl.⁶ .................................................. H01R 1/10
[52] U.S. Cl. .................................... 252/62.62; 252/62.63; 252/62.58; 252/62.57; 423/593; 428/694 GT; 428/694 T
[58] Field of Search .............................. 252/62.63, 62.57, 252/62.58, 62.62; 423/593; 428/694 GT, 694 T

[56] References Cited

U.S. PATENT DOCUMENTS

| | | | |
|---|---|---|---|
| 4,440,713 | 4/1984 | Rigby | 252/62.56 |
| 4,855,205 | 8/1989 | Saha et al. | 430/106.6 |
| 5,538,657 | 7/1996 | Ogata et al. | 252/62.63 |

FOREIGN PATENT DOCUMENTS

| | | |
|---|---|---|
| 303 151 | 2/1989 | European Pat. Off. . |
| 62-252325 | 11/1987 | Japan . |
| 2-258634 | 10/1990 | Japan . |

OTHER PUBLICATIONS

Du et al, "Magnetic Properties and High Tempeature Composition of the $La_xBa_{(1-x)}Fe_{(12-x)}Zn_xO_{19}$ Ferrites", J. Magnetism and Magnetic Materials, vol. 31–34 (2), 1983, pp. 793–794. No month.

Japanese Journal of Applied Physics, vol. 24, No. 1, pp. 51–56, Jan. 1985, Hiroshi Kojima, et al., "Magnetic Properties of W–Type Hexaferrite Powders".

Seance, pp. 3069–3072, Jun. 17, 1957, Andre Deshamps, et al., "Sur La Substitution De Baryum Par Une Terre Rare Dans L'Hexaferrite $BaO, 6Fe_2O_3$".

J. Phys. Chem. Solids, vol. 4, pp. 217–222, 1958, A.H. Mones, et al., "Cation Substitutions In $BaFe_{12}O_{19}$". No month.

Indian Journal of Pure & Applied Physics, vol. 8, pp. 412–415, Jul. 1970, V.N. Mulay, et al., "Synthesis & Properties of Some New Ferrites of Formula $La^{3+}Me^{2+}Fe^{3+}O_{19}$".

J. Phys. Chem. Solids, vol. 35, pp. 1633–1639, 1974, F.K. Lotgering, "Magnetic Anisotropy and Saturation of $LaFe_{12}O_{19}$ and Some Related Compounds". No month.

J. Phys. Chem. Solids, vol. 35, pp. 1641–1643, 1974, A.M. Van Diepen, et al., "Moessbauer Effect In $LaFe_{12}O_{19}$". No month.

J. Phys. Chem. Solids, vol. 2, pp. 312–317, 1957, R.N. Summergrad, et al., "New Hexagonal Ferrimagnetic Oxides". No month.

Primary Examiner—Melissa Bonner
Attorney, Agent, or Firm—Oblon, Spivak, McClelland, Maier & Neustadt, P.C.

[57] ABSTRACT

A magnet powder has a primary phase of hexagonal magnetoplumbite ferrite of the formula: $A_{1-x}R_x(Fe_{12-y}M_y)_zO_{19}$ wherein A is Sr, Ba, Ca or Pb; R is Y, rare earth element or Bi (R essentially containing La); M is Zn or Cd; x, y, and z representative of a molar ratio are $0.04 \leq x \leq 0.45$, $0.04 \leq y \leq 0.45$, and $0.7 \leq z \leq 1.2$. This ferrite is increased in saturation magnetization, offering a magnet having high remanence and maximum energy product. The magnet powder may be fired into a sintered magnet or bound into a bonded magnet. A magnetic recording medium comprising the magnet powder as a coating layer is provided as well as a magnetic recording medium comprising a thin film magnetic layer of the hexagonal magnetoplumbite ferrite.

19 Claims, 17 Drawing Sheets

REPLACEMENT RATIO (x)

$Sr_{1-x}La_xFe_{12-x}Zn_xO_{19}$

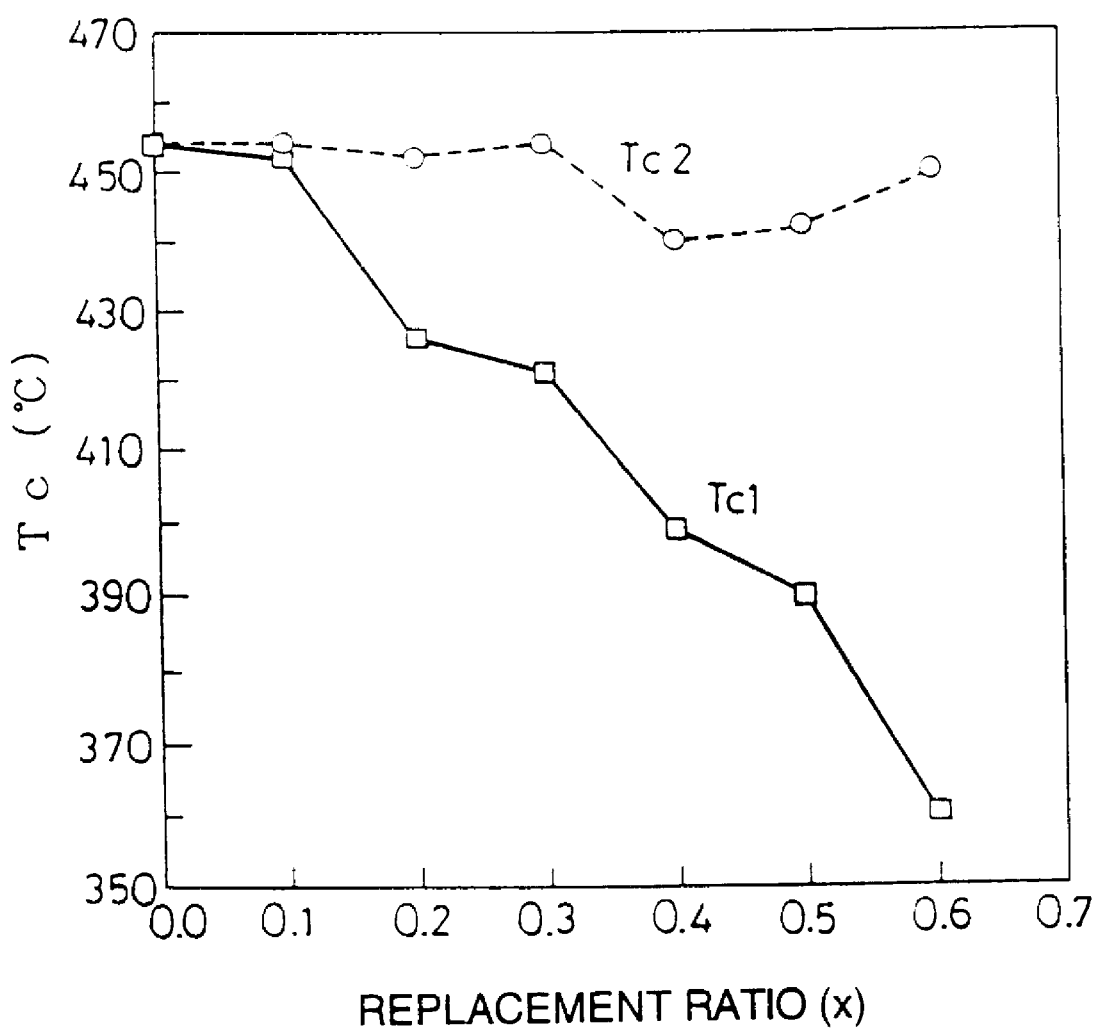

REPLACEMENT RATIO (x)

REPLACEMENT RATIO (x)

$Sr_{1-x}La_xFe_{12-x}Zn_xO_{19}$ $Sr_{1-x}La_xFe_{12-x}Zn_xO_{19}$ $(Sr_{0.8}La_{0.2+b}Fe_{11.8}Zn_{0.2}O_{19})$ $(Sr_{0.8}La_{0.2+b}Fe_{11.8}Zn_{0.2}O_{19})$

CALCINING TEMPERATURE (°C)

$(Sr_{0.7}(La_{1-a}Bi_a)_{0.3}Fe_{11.7}Zn_{0.3}O_{19})$

MAGNET POWDER, SINTERED MAGNET, BONDED MAGNET, AND MAGNETIC RECORDING MEDIUM

BACKGROUND OF THE INVENTION

1. Field of the Invention

This invention relates to a magnet powder having a primary phase of hexagonal magnetoplumbite ferrite, a sintered magnet and a bonded magnet prepared therefrom. It also relates to a magnetic recording medium comprising the magnetic powder and a magnetic recording medium having a thin film magnetic layer containing a hexagonal magnetoplumbite ferrite phase.

Oxide permanent magnet materials being currently used include hexagonal strontium and barium ferrites of the magnetoplumbite type (abbreviated as M type). Sintered magnets and bonded magnets are prepared therefrom.

Important magnet properties are remanence or residual magnetic flux density (Br) and intrinsic coercivity (HcJ). The remanence (Br) of a magnet is determined by the density, degree of orientation, and saturation magnetization ($4\pi Is$) which is determined by the crystalline structure. Br is thus expressed as Br=$4\pi Is \times$orientation$\times$density. Strontium and barium ferrites of the M type have a $4\pi IS$ value of about 4.65 kG. The density and degree of orientation are about 98% of the theory at maximum even in the case of sintered magnets providing the highest values of density and orientation. Therefore, the Br of these magnets is limited to about 4.46 kG. It is impossible in a substantial sense to obtain a Br value of higher than 4.5 kG.

On the other hand, the intrinsic coercivity (HcJ) which is given as the intersection between a $4\pi I$-H hysteresis curve and H axis is proportional to $H_A \times fc$ wherein $H_A$ (=$2K_1/Is$) is an anisotropy field and fc is a proportion of single domain particles. It is noted that $K_1$ is an anisotropy constant which is determined by the crystalline structure as is Is. The critical diameter (dc) within which particles have a single domain is given by the equation:

$$dc = 2(k \cdot Tc \cdot K_1/a)^{1/2}/Is^2$$

wherein k is the Boltzmann constant, Tc is a Curie temperature, and a is a distance between iron ions. Higher values of HcJ are obtained by comminuting particles to a particle size of not greater than the critical diameter dc to increase the proportion of single domain particles.

When HcB given as the intersection between a B-H hysteresis curve and H axis is used, the maximum energy product (BH)max of a magnet ideally reaches a maximum $Br^2/4$ when HcB>Br/2. It is noted that the B-H curve and the $4\pi I$-H curve have the relation: B=H+$4\pi I$. Higher values of (BH)max are obtained by increasing Br even a little and at the same time, providing a HcB (HcJ) value of more than Br/2. In the case of Br=4.6 kG, for example, HcJ>2.3 kOe is necessary. As a consequence, ferrite magnets should have HcJ values of at least 2 kOe in practical applications and preferably at least 3 kOe in those applications where a substantial inverse magnetic field is applied as in motors. In the prior art, increasing HcJ beyond 3 kOe is relatively easy, but Br is limited to about 4.46 kG as previously mentioned, resulting in (BH)max reaching about 4.5 to about 4.7 MGOe at maximum.

SUMMARY OF THE INVENTION

Therefore, an object of the present invention is to provide a ferrite magnet of the M hexagonal type which is increased in saturation magnetization to provide a high remanence and a high maximum energy product which could not be reached in prior art ferrite magnets of the M type.

Another object of the present invention is to provide a magnetic recording medium featuring a high remanence.

In a first aspect, the present invention provides a magnet powder comprising a primary phase of hexagonal magnetoplumbite ferrite of the formula:

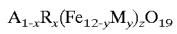

$$A_{1-x}R_x(Fe_{12-y}M_y)_zO_{19}$$

wherein A is at least one element selected from strontium, barium, calcium, and lead, R is at least one element selected from yttrium, rare earth elements, and bismuth, R essentially containing lanthanum, M is zinc and/or cadmium, and letters x, y, and z representative of a molar ratio are in the range: $0.04 \leq x \leq 0.45$, $0.04 \leq y \leq 0.45$, and $0.7 \leq z \leq 1.2$.

In one preferred embodiment, R contains at least 40 atom % of lanthanum. Preferably, x and y are $0.8 \leq x/y \leq 1.5$. The magnet powder may further contain up to 0.5% by weight of $B_2O_3$. The magnet powder will have a saturation magnetization of at least 72 emu/g. Typically, the magnet powder has a mean particle size of up to 1 $\mu$m.

A sintered magnet is obtained by sintering the above-defined magnet powder. The sintered magnet will have a remanence of at least 4.5 kG. The sintered magnet should preferably have a mean grain size of up to 1 $\mu$m. A bonded magnet comprising the above-defined magnet powder and a binder is also provided.

In a second aspect, the present invention provides a magnetic recording medium comprising the above-defined magnet powder. The invention also provides a magnetic recording medium comprising a thin film magnetic layer containing a hexagonal magnetoplumbite ferrite phase of the same formula as defined above.

In M type ferrites such as strontium and barium ferrites according to the invention, iron is partially replaced by an element M such as zinc, and element A which is typically strontium or barium is partially replaced by an element R such as lanthanum as seen from the above formula. This element replacement is adopted for the following reason.

In the M type ferrite, iron ions ($Fe^{3+}$) take position at five types of lattice sites as shown in FIG. 17. $Fe^{3+}$ at each site has an "upward" or "downward" spin magnetic moment (5 $\mu$B) and they are bonded through oxygen ions ($O^{2-}$) by superexchange interaction. Among these, $Fe^{3+}$ at $4f_1$ site has a downward magnetic moment and is the only ion that provides four-coordination to $O^{2-}$. It is therefore believed that if $Fe^{3+}$ at $4f_1$ site can be replaced by an ion giving strong favor to the four-coordinate position such as $Zn^{2+}$ and $Cd^{2+}$ and having no or little magnetic moment, then the downward magnetic moment is reduced, resulting in increased saturation magnetization.

However, $Zn^{2+}$ and $Cd^{2+}$ alone cannot substitute for $Fe^{3+}$ in the M type ferrite. When ZnO or CdO is added alone, for example, it generally forms a phase different from the M type ferrite, typically W type ferrite. This is probably because the valence of Zn and Cd is different from that of Fe although the ionic radius (0.74 Å) of $Zn^{2+}$ and the ionic radius (0.92 Å) of $Cd^{2+}$ are close to the ionic radius (0.79 Å) of $Fe^{3+}$. The W type ferrite containing Zn or Cd generally has higher saturation magnetization than the M type ferrite, but is unlikely to provide a HcJ of 2 kOe or more because the anisotropy constant ($K_1$) and anisotropy field ($H_A$) are low. As a result, (BH)max is also low.

The present inventors have succeeded in improving the saturation magnetization of M type ferrite and thus achieving higher Br and (BH)max than in the prior art by adding not only Zn and/or Cd, but also element R to M type ferrite to accomplish Zn and/or Cd replacement in the M type ferrite. The combined addition of Zn and/or Cd and element R intends to compensate for the above-mentioned difference of valence. More particularly, sintered magnets of the invention wherein element A is mainly strontium or barium will reach a Br value of 4.5 kG or higher which was regarded substantially impossible in the prior art. The same magnets will also reach a (BH)max value of 4.8 MGOe or higher which was regarded impossible in the prior art. Even (BH) max values of 4.9 MGOe or higher are achievable. Additionally, the magnet powder of the invention will achieve a saturation magnetization of 72 emu/g or higher.

The magnet of the invention has magnetic properties which change only a little with fluctuations of firing conditions including firing temperature and atmosphere. Therefore, magnets having consistent magnetic properties can be produced on a mass scale even when firing equipment which are difficult to control fluctuations of oxygen partial pressure and firing temperature, for example, continuous firing gas furnaces are used.

Also contemplated in the present invention is a coating type magnetic recording medium comprising a magnetic layer having the instant magnet powder dispersed in a binder. Also included is a magnetic recording medium having a thin film magnetic layer having the same hexagonal magnetoplumbite ferrite phase as the instant magnet. In either case, the magnetic recording medium produces high outputs at high S/N by taking advantage of high remanence. The magnetic recording medium of the invention can be utilized as a perpendicular magnetic recording medium which accommodates for a higher recording density. The magnetic recording medium of the invention is also amenable to magneto-optical recording.

Now the literature is discussed. J. Phys. Chem. Solids, Pergamon Press, 1958, Vol. 4, pp. 217–222 relates to additive elements to $BaFe_{12}O_{19}$. Reference is made to a compound of $Ba_{1-x}Me^{2+}{}_xLa^{3+}{}_xFe^{3+}{}_{12-x}O_{19}$ type wherein $Me^{2+}$ is $Zn^{2+}$ or $Mg^{2+}$ and La is an element for compensating for a valence. Although the compound of this reference overlaps the ferrite phase of the instant magnet, this reference describes neither an improvement in saturation magnetization achieved when $Me^{2+}$ is $Zn^{2+}$ nor the range of x. It is only described that measurements dropped when $Me^{2+}$ is $Mg^{2+}$.

Indian Journal of Pure & Applied Physics, Vol. 8, July 1970, pp. 412–415 describes a ferrite of the formula:

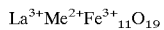
$$La^{3+}Me^{2+}Fe^{3+}{}_{11}O_{19}$$

wherein $Me^{2+}$ is $Zn^{2+}$, $Cd^{2+}$, $Ni^{2+}$, $Cu^{2+}$ or $Mg^{2+}$. The saturation magnetization of this ferrite at room temperature is not so high and reaches only 53 cgs unit at maximum when $Me^{2+}$ is $Ni^{2+}$. This ferrite has low saturation magnetization probably because its composition (free of barium and strontium) is outside the scope of the present invention.

Japanese Patent Application Kokai (JP-A) No. 252325/1987 discloses a ferrite of the formula:

$$(Ba_{1-A}La_A)(Fe_{12-X-Y}M^{2+}{}_XM^{4+}{}_Y)O_{19}$$

wherein A≡X−Y and X>Y. This ferrite wherein a divalent metal ion $M^{2+}$ includes $Zn^{2+}$ and $Cd^{2+}$, but a tetravalent ion $M^{4+}$ is essentially contained is different from the magnet composition of the present invention. No examples disclosed therein use $Zn^{2+}$ and $Cd^{2+}$. The ferrites of Examples have a saturation magnetization of 52.1 emu/g at maximum.

Since JP-A 252325/1987 relates to the manufacture of substitution type barium ferrite for magnetic recording by hydrothermal synthesis and aims to improve the crystallinity of barium ferrite, it is different from the present invention which aims to manufacture a magnet having high saturation magnetization.

JP-A 258634/1990 discloses a fine powder magnetic hexaferrite of the formula:

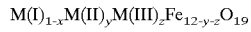
$$M(I)_{1-x}M(II)_yM(III)_zFe_{12-y-z}O_{19}$$

wherein M(I) is Ba, Sr or rare earth metals, M(II) is Fe(II), Mn, Co, Ni, Zn, Cu, Cd, Mg, or Sn(II), M(III) is Ti, Zr, etc., x is 0 to 0.5, y is 0 to 1.5, z is 0 to 1.5, $0 \leq y + z \leq 3$, and $x+y+z>1$. No examples disclosed therein use Zn and Cd. It is not taught that the addition of Zn and Cd improves saturation magnetization.

BRIEF DESCRIPTION OF THE DRAWINGS

FIG. 3 is a graph showing Curie temperature as a function of a replacement ratio x of La and Zn.

FIGS. 13A, 13B, 13C and 13D are graphs showing magnetic properties as a function of b of a sintered body having the composition $Sr_{0.8}La_{0.2+b}Fe_{11.8}Zn_{0.2}O_{19}$.

Figure 1A:
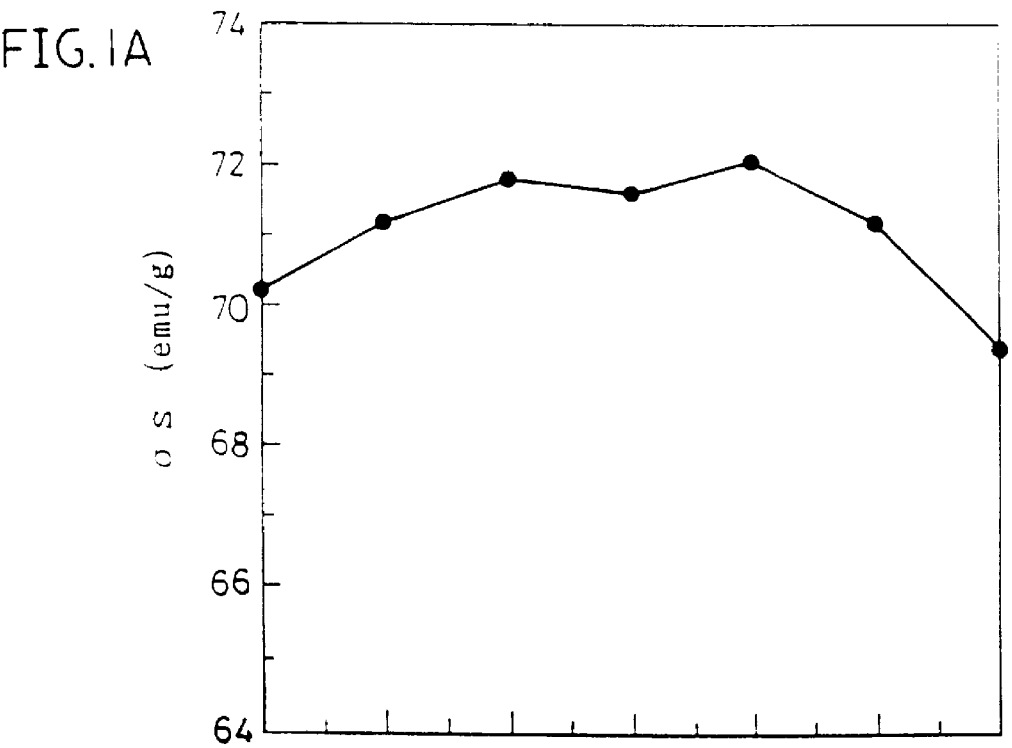
FIGS. 1A and 1B are graphs showing magnetic properties of a calcined body as a function of a replacement ratio x of La and Zn.

In the below Detailed Description of the Invention, reference to a Figure is intended to include all letter designations of said Figure, where applicable.

DETAILED DESCRIPTION OF THE INVENTION

The magnet powder of the invention is defined as comprising a primary phase of hexagonal magnetoplumbite ferrite of the following formula.

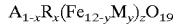

$$A_{1-x}R_x(Fe_{12-y}M_y)_zO_{19}$$

In the formula, A is at least one element selected from the group consisting of strontium Sr, barium Ba, calcium Ca, and lead Pb. At least one of Sr and Ba is preferred as element A, with Sr being most preferred.

R is at least one element selected from the group consisting of yttrium Y, rare earth elements, and bismuth Bi. Element R essentially contains lanthanum La. The proportion of lanthanum in R is preferably at least 40 at %, more preferably at least 70 at %. For improving saturation magnetization, it is most preferred that R consists of lanthanum. This is because lanthanum is highest when the limit amount of forming a solid solution with M hexagonal type ferrite is compared. Therefore, a too low proportion of lanthanum in R would lead to low saturation magnetization. It is noted that the use of bismuth along with lanthanum ensures effective production because the calcining temperature and sintering temperature can be lower.

M is at least one element selected from zinc Zn and cadmium Cd. The proportion of zinc and cadmium in M is not critical although cadmium is rather difficult to handle in industrial manufacture because of its toxicity.

Letters x, y, and z representative of a molar ratio are in the range:

$$0.04 \leq x \leq 0.45,$$

$$0.04 \leq y \leq 0.45, \text{ and}$$

$$0.7 \leq z \leq 1.2.$$

Each of x and y is preferably at least 0.05, more preferably at least 0.1, most preferably at least 0.15 and preferably less than 0.45, more preferably up to 0.42, more preferably up to 0.4, most preferably up to 0.35. Letter z is preferably $0.8 \leq z \leq 1.1$, more preferably $0.9 \leq z \leq 1.05$.

In the above formula, too smaller values of x indicate smaller amounts of solid solution of element R with the hexagonal ferrite, leading to less improvements in saturation magnetization. With too larger values of x, an excess of element R cannot substitute or form a solid solution in the hexagonal ferrite, forming an ortho-ferrite containing element R to detract from saturation magnetization. Too smaller values of y lead to less improvements in saturation magnetization. With too larger values of y, an excess of element M cannot substitute or form a solid solution in the hexagonal ferrite, and substantial losses of anisotropy constant ($K_1$) and anisotropy field ($H_A$) occur even when element M can substitute and form a solid solution. Too smaller values of z increase the amount of a nonmagnetic phase containing elements A and R to detract from saturation magnetization. Too larger values of z increase the amount of $\alpha$-$Fe_2O_3$ phase or nonmagnetic spinel ferrite phase containing element M, also lowering saturation magnetization.

Letters x and y preferably satisfy the relationship: $0.8 \leq x/y \leq 1.5$, more preferably $0.9 \leq x/y \leq 1.4$. Outside this range, an equilibrium in valence would not be established between elements R and M, tending to form hetero-phases such as W type ferrite. Since element M is divalent, the relation of x to y is ideally x/y=1 when element R is a trivalent ion.

The formula representing the primary phase composition prescribes that the molar ratio of O to $A_{1-x}R_x$ is 19, which stands for the stoichiometric compositional ratio given when all Rs are trivalent, x=y, and z=1. The molar ratio or stoichiometric compositional ratio of O, of course, varies with the type of R and the values of x, y, and z. It is assumed throughout the specification that the mole number of O is 19 independent of the type of R and the values of x, y, and z. Understandably, the actual molar ratio of O may deviate from the stoichiometric compositional ratio.

R and M do not collect at the grain boundary. The distribution (atomic ratio) of R and M between the grain boundary and the grain interior as measured by TEM/EDS is usually from about 0.5/1 to about 2/1 for R and from about 0.3/1 to about 3/1 for M.

The composition of the primary phase can be measured by fluorescent X-ray quantitative analysis, for example.

Boron oxide $B_2O_3$ may be contained in the magnet powder of the invention. Inclusion of $B_2O_3$ is effective for lowering the calcining and sintering temperatures, which is advantageous in manufacture. The content of $B_2O_3$ is preferably up to 0.5% by weight of the entire magnet powder. Too large contents of $B_2O_3$ would lower saturation magnetization.

The magnet powder of the invention may contain at least one of sodium Na, potassium K, and rubidium Rb. The total content of Na, K, and Rb is preferably up to 3% by weight of the entire magnet powder when they are calculated as $Na_2O$, $K_2O$, and $Rb_2O$, respectively. Too large contents of these elements would lower saturation magnetization. Provided that these elements are represented by $M'$, the primary phase contains $M'$, for example, in the form of

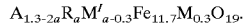

$$A_{1.3-2a}R_aM'_{a-0.3}Fe_{11.7}M_{0.3}O_{19}.$$

Preferably, letter a is $0.3 \leq a \leq 0.5$. Too larger values of a would lower saturation magnetization and allow more of element $M'$ to evaporate during sintering.

The magnet powder of the invention consists of particles preferably having a mean particle size of up to 1 μm, more preferably 0.5 to 1 μm. A too large mean particle size indicates that the magnet powder has a higher proportion of multi-domain particles and hence, lower HcJ. A too small mean particle size would adversely affect orientation during compacting in a magnetic field and compactability.

Usually, the magnet powder of the invention is used to form bonded magnets in which magnet particles are bound with a binder.

Next, it is described how to prepare the magnet powder of the invention.

The magnet powder of the invention is prepared by using an iron oxide powder, a powder containing element A, a powder containing element R, and a powder containing element M as stock powders and calcining a mixture of these powders. The powder containing element A, the powder containing element R, and the powder containing element M may be oxides or compounds capable of converting into oxides upon firing, for example, carbonates, hydroxides, and nitrates. The stock powders may have any desired mean particle size although the iron oxide powder is preferably a fine one, typically of primary particles having a mean particle size of up to 1 μm, especially up to 0.5 μm. In addition to the above-mentioned stock powders, there may be added $B_2O_3$ and other compounds, for example, compounds containing Si, Ca, Pb, Al, Ga, Cr, Sn, In, Co, Ni, Ti, Mn, Cu, Ge, Nb, Zr, Li, etc., if necessary.

The powder mixture is calcined in air, for example, at a temperature of about 1,000° to 1,350° C. for about 1 second to about 10 hours, especially about 1 second to about 3 hours. The thus calcined body has a ferrite structure of substantially the magnetoplumbite type. The primary particles have a mean particle size of up to 1 μm, preferably 0.1 to 1 μm, more preferably 0.1 to 0.5 μm. The mean particle size is measured by scanning electron microscopy.

The calcined body is then ground or disintegrated into a magnet powder. The magnet powder is blended with a binder selected from resins, metals and rubber, compacted in the presence or absence of a magnetic field, and optionally cured, obtaining a bonded magnet.

In another application, the magnet powder is blended with a binder to form a coating composition, which is applied to the surface of a substrate of resin or the like and optionally cured to form a magnetic layer. There is obtained a magnetic recording medium of the coating type.

In another form of the invention, the calcined body is sintered to form a sintered magnet. Like the magnet powder, the sintered magnet has a primary phase of hexagonal magnetoplumbite ferrite represented by the above-mentioned formula. Preferably, the sintered magnet is prepared by the following procedure.

First, the calcined body is milled. The step of milling the calcined body is preferably carried out in such a manner as to introduce crystal strains to reduce HcB. If the calcined particles are reduced in size (into single domain particles), they tend to agglomerate because magnetic forces act among the particles due to increased HcJ and HcB. This eventually prevents a magnetic field from imparting anisotropy. An attractive or cohesive force among calcined particles is proportional to the square of a magnetic flux density at the particle surface. As the HcB in a hysteresis loop of a single calcined particle increases, the surface magnetic flux density is greater and hence, the cohesive force is greater. Therefore, for the purpose of reducing the cohesive force of calcined particles, it is advantageous to introduce crystal strains to lower HcB for reducing the squareness in the second quadrant. Then a high degree of orientation is established during magnetic field orientation. Since the strains once introduced into the particles are removed in the firing step subsequent to compaction in a magnetic field, there is obtained a sintered magnet having improved magnetic properties.

The lowering of HcJ of calcined particles by crystal strains has an additional effect of reducing the change of HcJ with temperature. Specifically, the temperature coefficient of HcJ is reduced to about 1 to 6 Oe/°C. in the temperature range between −100° C. and +150° C. For this reason, the magnet powder of strained particles is a useful magnetic powder for magnetic recording media.

For introducing such crystal strains, mechanical pulverization is effective. Pulverization is preferably accomplished, for example, by first performing dry pulverization to introduce sufficient crystal strains. The pulverizing machine used in dry pulverization may be selected from dry vibratory mills, dry attritors (media agitating mills) and dry ball mills, with the dry vibratory mills being preferably used.

Dry pulverization is continued until a BET specific surface area is increased 2 to 10 times, thereby introducing about $3 \times 10^{-4}$ to $7 \times 10^{-4}$ of crystal strains in (206) plane, for example. The powder as dry pulverized preferably has a mean particle size of about 0.1 to 1 μm and a BET specific surface area of about 4 to 10 m$^2$/g.

Next the dry pulverized powder is generally subject to wet pulverization. Wet pulverization is continued until the BET specific surface area is increased about 1 to 4 times, especially about 1 to 3 times, whereby the powder has a mean particle size of about 0.1 to 0.8 μm and a BET specific surface area of about 6 to 12 m$^2$/g. This wet pulverization also increases crystal strains so that the strain amount of calcined particles usually reaches or exceeds $10^{-4}$. Since a strain amount enough to reduce HcJ can be achieved solely by wet pulverization with the dry pulverization omitted, pulverization may be wet pulverization alone. Inversely only dry pulverization may be used. For wet pulverization, ball mills, attritors and vibratory mills are preferably used.

The solvent used in wet pulverization may be an aqueous solvent such as water although the present invention favors use of a non-aqueous solvent as a slurry medium during wet pulverization. The non-aqueous solvents used herein are typically organic solvents which include hydrocarbons, for example, heptane, industrial gasoline, kerosine, cyclohexane, toluene, xylene, ethylbenzene, and turpentine oil; halogenated hydrocarbons, for example, 1,2-dibromoethane, tetrachloroethylene, perchloroethylene, dichloropentane, and monochlorobenzene; monohydric alcohols, phenols and ethers, for example, methanol, ethanol, n-propyl alcohol, n-butyl alcohol, cyclohexanol, phenol, and n-butyl ether; acids and esters, for example, butyl acetate; polyhydric alcohols and ethers and esters thereof, for example, ethylene glycol; aldehydes, acetals and ketones, for example, acetone, methyl ethyl ketone, methyl isobutyl ketone, and cyclohexanone; silicone fluids, for example, low viscosity silicone fluid; nitrogenous compounds, for example, ethylene diamine; sulfur compounds, for example, carbon disulfide; and paint thinners, for example, lacquer thinners, and mixtures thereof. The non-aqueous solvent alone or a mixture of such solvents preferably has a viscosity of 0.3 to 3 centipoise at 20° C., more preferably 0.3 to 2.0 centipoise at 20° C., especially 0.4 to 1.5 centipoise at 20° C. because compaction and the degree of orientation of a compact are significantly improved. Preferably the non-aqueous solvent has a vapor pressure of 0.1 to 200 mmHg at 20° C., more preferably 1 to 200 mmHg at 20° C. and a boiling point of 50° to 300° C., more preferably 50° to 200° C. Also during wet pulverization, the non-aqueous solvent should preferably occupy about 10 to 90% by weight of the slurry while the amount of calcined particles in the slurry is 10 to 90% by weight.

In such wet pulverization, at least one surfactant is preferably added to the slurry. The amount of surfactant added is preferably 0.1 to 5.0% by weight, especially 0.3 to 3.0% by weight based on the calcined powder. The surfactant is generally amphiphatic in that it has a hydrophilic group which can adsorb to the surface of calcined particles and a lipophilic (or hydrophobic) group which has affinity to the non-aqueous solvent used. It is preferred that the solubility parameter (SP) of the surfactant used is close to the SP of the non-aqueous solvent used. It is also preferred that substantially the entire amount of the surfactant added adsorbs to the calcined powder in the slurry. The surfactant added permits primary particles of the calcined powder to effectively disperse in the slurry after wet pulverization so that a significant improvement in degree of orientation is achieved upon wet compaction in a magnetic field.

The surfactants used herein include cationic, anionic, non-ionic and ampholytic ones although the preferred surfactant contains at least one of saturated or unsaturated fatty acids having 4 to about 30 carbon atoms or salts thereof, for example, carboxylic acids and salts thereof such as stearic acid, oleic acid, zinc stearate, calcium stearate, strontium stearate, barium stearate, magnesium stearate, aluminum stearate, zinc oleate, calcium oleate, strontium oleate, barium oleate, magnesium oleate, aluminum oleate, and ammonium oleate. Among these, use of calcium salts of fatty acids, especially stearic acid is advantageous because solvent removal during compaction is improved to prevent cracks from occurring in the compact without detracting from a degree of orientation. This is probably because the density of a compact decreases from 3.0 g/cm$^3$ to 2.8 g/cm$^3$ to facilitate solvent removal. Also it is possible that an effective additive element which can be added to ferrite, such as Ca, Ba, Sr, Al, Cr, Ga, Cu, Zn, Mn, Co, and Ti be highly dispersed around calcined particles by adding an organic material containing such an element (for example, metal salts of organic surfactants such as metal salts of fatty acids). Additionally, there may be used at least one of well-known sulfonic acids and salts thereof; sulfate esters and salts; phosphate esters and salts; aliphatic amine salts or quaternary ammonium salts; aromatic quaternary ammonium salts; pyridinium salts; imidazolinium salts; betaine; aminocarboxylic salts; imidazoline derivatives; and natural surfactants.

When such a surfactant is added to the non-aqueous solvent slurry containing the calcined powder and wet pulverization is performed, the resulting slurry can be directly used for wet compaction. Alternatively, part or the entirety of the surfactant may be added during dry pulverization of the calcined powder which is carried out prior to wet pulverization or alone. Also part or the entirety of the surfactant may be added after wet pulverization of the non-aqueous solvent slurry. Moreover, after dry pulverization, the surfactant and the non-aqueous solvent may be added to prepare a slurry which is subject to wet compaction. Since the surfactant is present in the slurry during its wet compaction in a magnetic field, all these procedures offer an advantage of improving the degree of orientation of a compact. It is noted that the amounts of the surfactant added at plural stages may be determined so that the above-mentioned amount of surfactant added is eventually available in the slurry for wet compaction.

When an aqueous solvent is used for wet pulverization, especially when water or a mixed solvent of water is used from the handling point of view, the source powder occupies about 10 to 70% by weight of the slurry during wet pulverization. However, since no improvement in degree of orientation of a compact is expectable when the water slurry having a surfactant added is subject to wet compaction, solvent replacement from water to a non-aqueous solvent is preferably carried out. The solvent replacement is carried out by subjecting the slurry to decantation with the source powder being magnetically supported. It is noted that this wet compaction may be preceded by dry pulverization.

In this embodiment where wet pulverization using an aqueous solvent is followed by solvent replacement, the surfactant should be present in the above-mentioned amount prior to the final wet compaction. To this end, the surfactant may be added at any one of the stages of dry pulverization, wet pulverization, and final slurry preparation. In any case, the final slurry for wet compaction is adjusted to a non-aqueous solvent content of about 5 to 30% by weight and a calcined particle content of about 70 to 95% by weight.

After the final non-aqueous solvent slurry containing the surfactant is prepared in this way, it is wet compacted in a magnetic field while removing the non-aqueous solvent from the slurry. Solvent removal may be carried out in a conventional manner, for example, by forced removal under vacuum. The compacting pressure is about 0.1 to 0.5 ton/cm$^2$ and the magnetic field applied is about 5 to 15 kG. The resulting compact has a degree of orientation Ir/Is of at least 75%, typically 78 to 86%. Such a high degree of orientation is accomplished only when the non-aqueous solvent and the surfactant are used in combination, but not when the surfactant is added to a water slurry.

It is noted that the compact may contain various additives in addition to the calcined ferrite powder. The additives are, for example, compounds containing Si, Ca, Ba, Sr, etc. Where element A is composed mainly of strontium or barium, it is preferred from the standpoint of remanence improvement to add silicon and calcium. These compounds are generally added in the form of oxides and carbonates. The time when these compounds are added is not critical. These compounds may be added at any stage from pulverization of the calcined body to compaction although they are preferably added during pulverization of the calcined body, typically at the initial of the pulverization step. When these compounds are added in powder form, the powder preferably has a mean particle size of about 0.01 to 5 μm. These additive components, especially silicon and calcium are present as grain boundary components in magnets. The distribution (atomic ratio) of the additive component between the grain boundary and the grain interior as measured by TEM/EDS is usually from about 10/1 to about 100/1.

After compaction in a magnetic field, the compact is burnt out. More particularly, the compact is heat treated in air or nitrogen at a temperature of 100° to 500° C. to burn out or decompose away the added surfactant. Then the compact is sintered, for example, in air at a temperature of 1,150° to 1,250° C., especially 1,160° to 1,220° C. for about ½ to 3 hours, obtaining a sintered magnet. The sintered magnet preferably has a mean grain size of up to 1 μm, more preferably 0.5 to 1.0 μm as measured by scanning electron microscopy.

Alternatively, the compact is disintegrated by a crusher or the like and sieved to collect a fraction of particles having a mean particle size of 100 to 700 μm suitable for magnetic field orientation. The particles are then dry compacted under a magnetic field and similarly sintered, obtaining a sintered magnet.

Also, in the manufacturing procedure mentioned above, only introduction of mechanical strains can be carried out by pulverization without using the surfactant. In this embodiment, pulverization may be either dry or wet pulverization as mentioned above. In the preferred embodiment wherein wet pulverization is carried out, water or a mixed solvent of water is preferred as the slurry solvent because of ease of handling. On wet pulverization, the solvent preferably occupies about 10 to 90% by weight of the slurry, especially about 30 to 90% by weight of the water slurry, and the calcined particles occupy about 10 to 90% by weight of the slurry, especially about 10 to 70% by weight of the water slurry.

After wet pulverization, the slurry may be subject to wet compaction without further treatment. Also, dry pulverization of calcined powder may be carried out prior to wet compaction as previously mentioned. Further, a solvent may be added after dry pulverization to prepare a slurry for wet compaction. Moreover, the wet pulverization and wet compaction steps may use different solvents. In any case, the final slurry for wet compaction is adjusted to a water or solvent content of about 5 to 30% by weight and a calcined particle content of about 70 to 95% by weight. Where the aqueous slurry is subject to wet pulverization, a dispersant is preferably added upon pulverization.

Also contemplated herein is a magnetic recording medium having a thin film magnetic layer. Like the magnet powder and sintered magnet of the invention, the thin film magnetic layer has a hexagonal magnetoplumbite ferrite phase of the above-defined formula. The thin film magnetic layer is preferably formed by sputtering. For sputtering, the sintered magnet of the invention may be used as a target. Multi-target sputtering using two or more oxide targets is also acceptable. In this case, zinc which is more likely to evaporate than the remaining elements is contained in the target in a slight excess amount to compensate for the evaporation loss. The sputtered film is generally heat treated to establish a hexagonal magnetoplumbite structure.

EXAMPLE

Examples of the present invention are given below by way of illustration and not by way of limitation.

Example 1

Magnet Powder (Comparison in Terms of R-M Replacement)

The following raw materials were used.

| Type | Primary particle size |
| --- | --- |
| $Fe_2O_3$ powder | 0.3 $\mu$m |
| $SrCO_3$ powder | 2 $\mu$m |
| ZnO powder | 0.3 $\mu$m |
| $La_2O_3$ powder (99.9% purity) | |
| $SiO_2$ powder | 0.01 $\mu$m |
| $CaCO_3$ powder | 1 $\mu$m |

The $Fe_2O_3$ powder, $SrCO_3$ powder, ZnO powder, and $La_2O_3$ powder were blended such that the primary phase would have the composition:

wherein replacement ratio x=0, 0.1, 0.2, 0.3, 0.4, 0.5 and 0.6. Then $SiO_2$ powder and $CaCO_3$ powder were added to the blend in amounts of 0.2% and 0.15% by weight based on the weight of the blend, respectively. The resulting mixture was milled in a wet attritor for 2 hours for particle size regulation and dried. The particles were calcined in air at 1,200° C. for 3 hours, obtaining a powdery calcined body as a magnet powder. The composition of its primary phase was examined by fluorescent X-ray quantitative analysis.

The calcined bodies were analyzed by X-ray diffractometry to find a single M type ferrite phase when x ≦0.4, a mixture of an M type ferrite phase with $\alpha$-$Fe_2O_3$ and $LaFeO_3$ phases when x=0.5, and a similar mixture further containing a spinel phase when x=0.6.

Figure 1B:
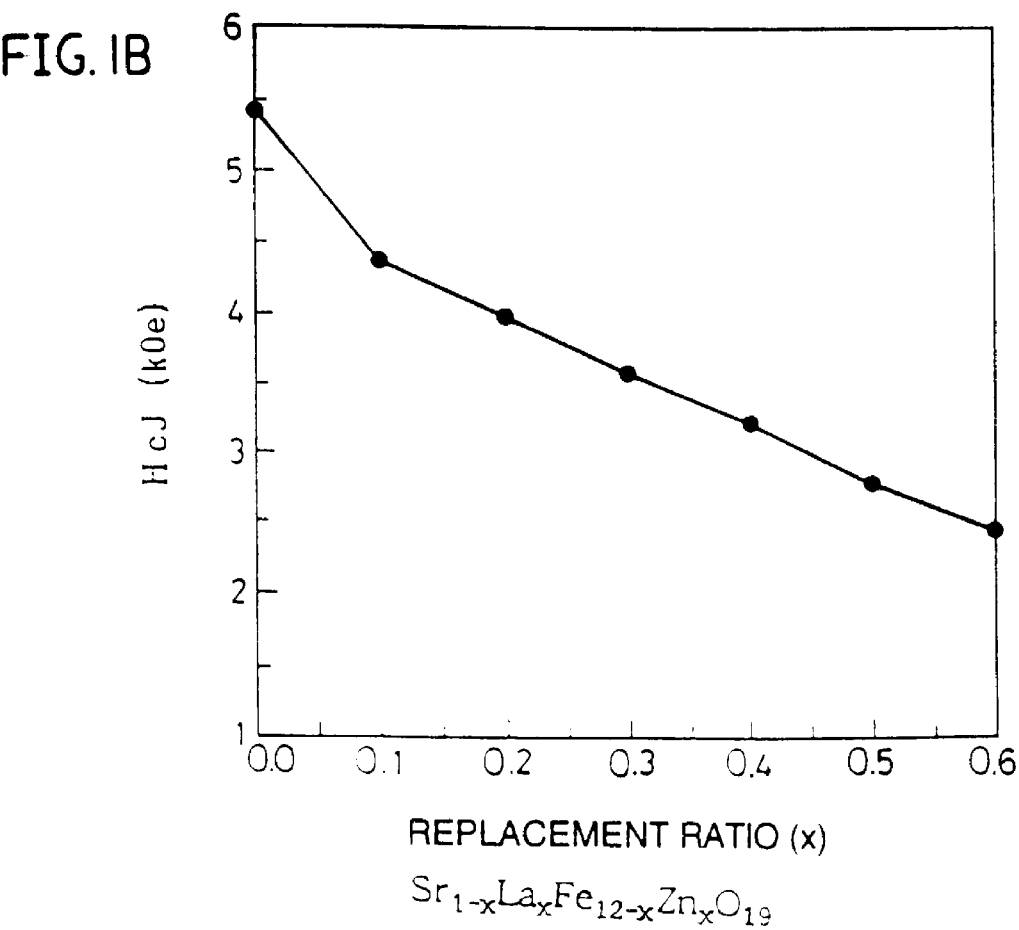

The calcined bodies were measured for saturation magnetization $\sigma$s and coercivity HcJ by a vibrating sample magnetometer (VSM). The results are plotted in FIG. 1. It is seen from FIG. 1 that within the replacement range of 0.1 ≦x≦0.4, $\sigma$s values are maintained high and HcJ is not so reduced.

Figure 2:
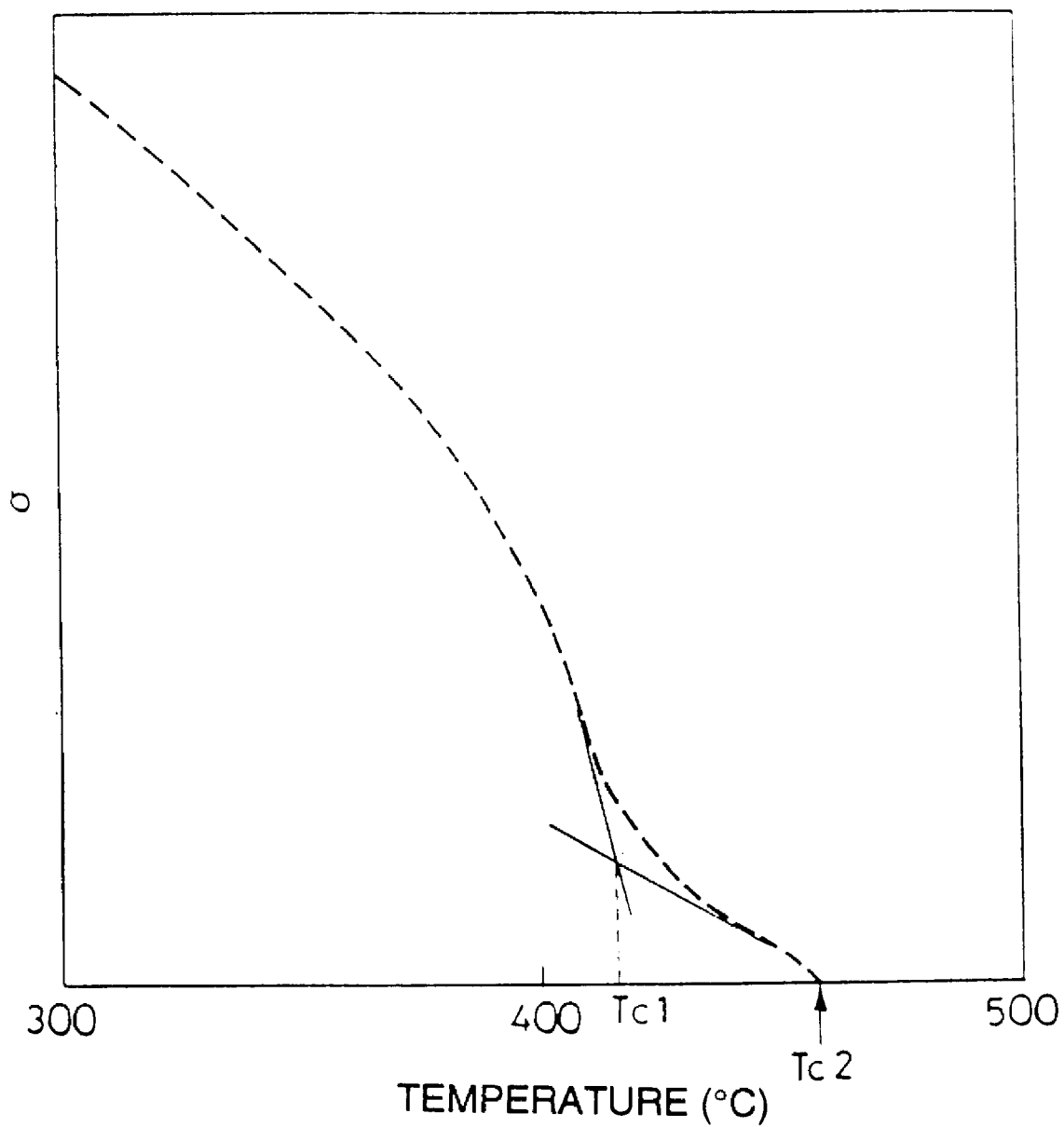
FIG. 2 is a graph showing magnetization versus temperature.
Figure 4A:
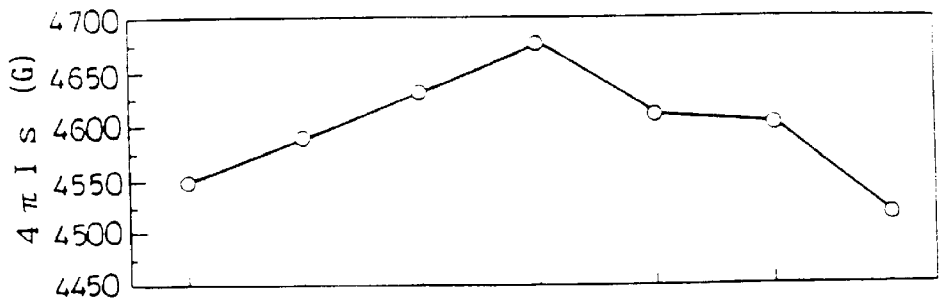
FIGS. 4A, 4B, 4C and 4D are graphs showing magnetic properties of a sintered body as a function of a replacement ratio x of La and Zn.
Figure 4B:
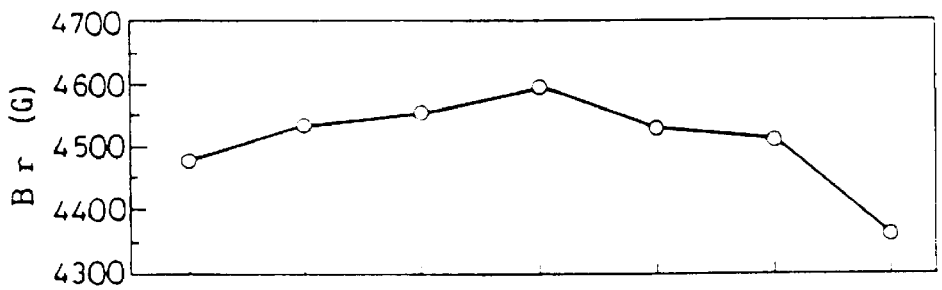
Figure 4C:
Figure 4D:
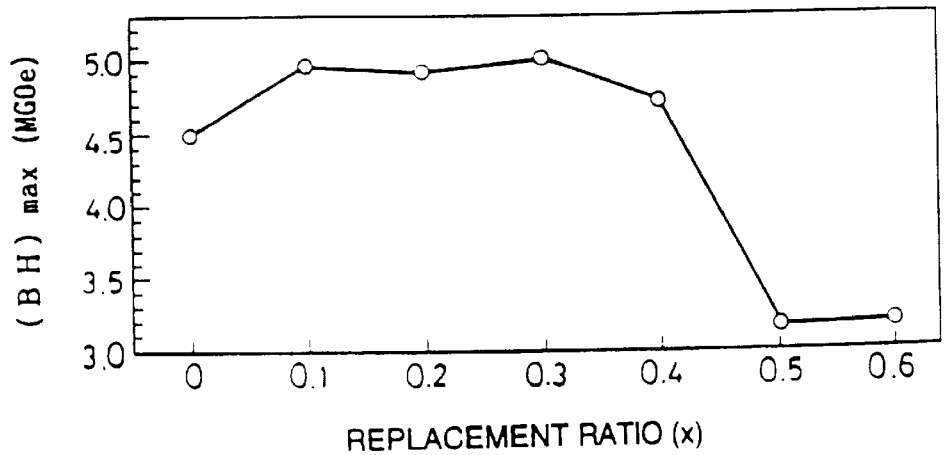

FIG. 2 shows a temperature-magnetization curve at a replacement ratio x=0.3. This magnetization curve was drawn by magnetizing a calcined body and measuring magnetization while heating it. As shown in FIG. 2, the temperature-magnetization curve includes two steps despite the single phase found by X-ray diffractometry. That is, two Curie temperatures depicted by Tc1 and Tc2 are included. This is probably because there were left local sites where replacement by La and Zn was restrained. FIG. 3 shows the lower Curie temperature Tc1 and higher Curie temperature Tc2 as a function of a replacement ratio x. It is seen that Tc1 follows a simple decline as x increases, proving that La and Zn added had substituted and formed solid solution.

The calcined body with x=0.3 had a mean primary particle size of 0.43 $\mu$m as observed by scanning electron microscopy.

Example 2-1

Sintered Magnet (Comparison in Terms of R-M Replacement)

To the calcined powder of Example 1 were added 0.4% by weight of the $SiO_2$ powder and 1.25% by weight of the $CaCO_3$ powder. The mixture was milled in a dry vibratory mill until the calcined powder reached a specific surface area of 7 $m^2$/g.

Next, the calcined powder was wet milled in a ball mill using xylene as a nonaqueous solvent and oleic acid as a surfactant. Oleic acid was added in an amount of 1.3% by weight of the calcined powder. The slurry contained 33% by weight of the calcined powder. Pulverization was continued until the specific surface area reached 8 or 9 $m^2$/g. These milling steps introduced strains into the calcined powder so that the HcJ of the calcined powder was reduced to 40 to 60% of that prior to pulverization.

The pulverized slurry was then centrifuged so that the slurry contained the calcined powder in a concentration of 80 to 85% by weight. While removing the solvent from the slurry, a cylindrical compact of 30 mm diameter and 15 mm height was compacted in a magnetic field of about 13 kG applied in the height direction. The compression pressure was 0.4 ton/$cm^2$.

The compact was heat treated at 100° to 300° C. until the oleic acid was fully removed. It was then fired in air at a heating rate of 5° C./min. to a maximum temperature of 1,220° C. for one hour, obtaining a sintered body. The sintered body was finished on the upper and lower surfaces before magnetic properties were measured. The results are shown in FIG. 4. It is seen from FIG. 4 that excellent magnetic properties including Br of more than 4.5 kG and (BH)max of more than 4.8 MGoe are obtained in the replacement range of 0.1≦x≦0.4.

Figure 5A:
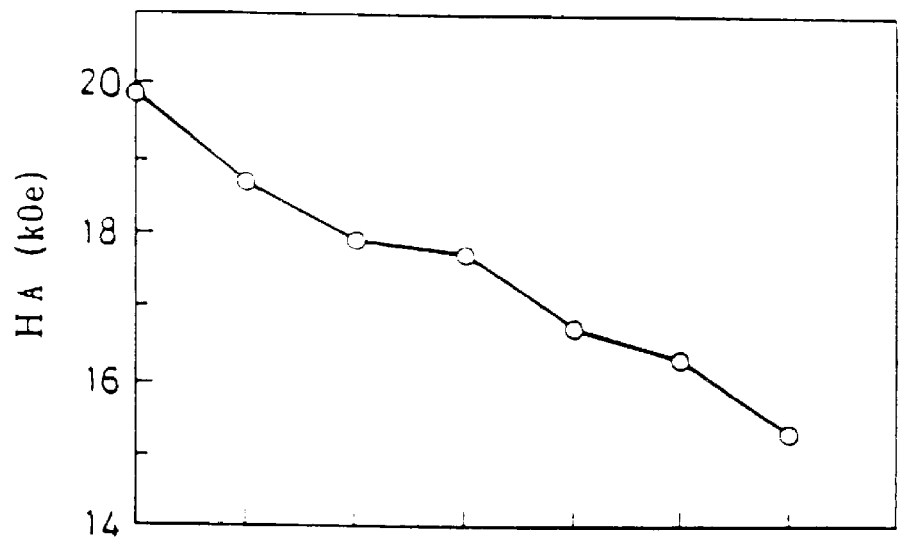
FIGS. 5A and 5B are graphs showing an anisotropy field ($H_A$) and a temperature coefficient of saturation magnetization ($\Delta\sigma s/\Delta T$) as a function of a replacement ratio x of La and Zn.
Figure 5B:
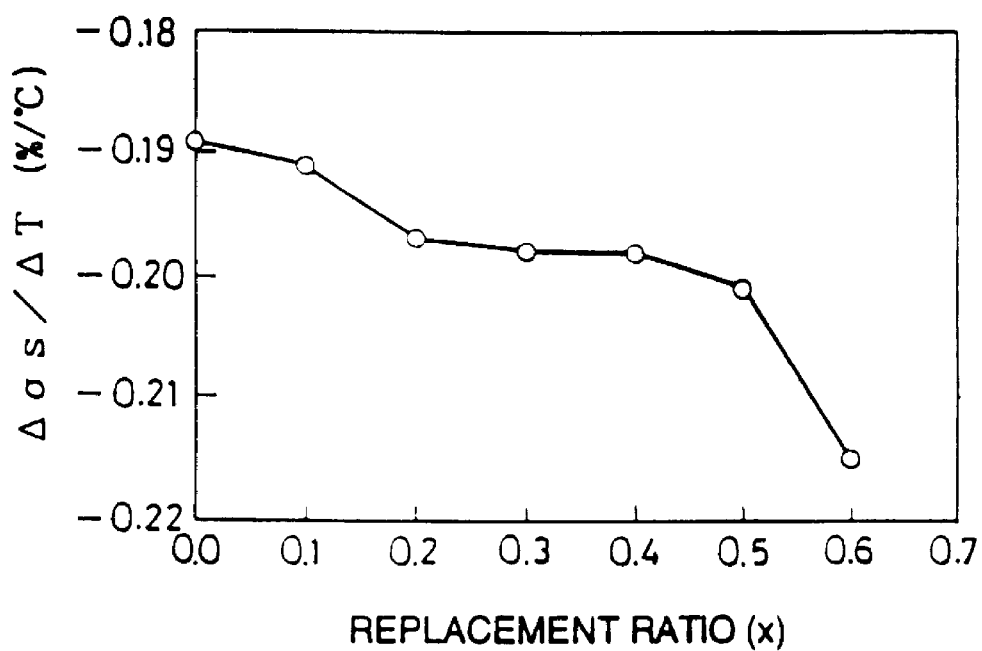

FIG. 5 shows the anisotropy field ($H_A$) as measured by a torque meter and the temperature coefficient of saturation magnetization ($\Delta\sigma$s/$\Delta$T) as a function of a replacement ratio x. In the replacement range of 0.1≦x≦0.4, $H_A$ is more than about 17 kOe, which is higher than that of $Zn_2$W type ferrite. Also in the replacement range of 0.1≦x≦0.4, the magnitude of $\Delta\sigma$s/$\Delta$T is less than 0.20%/°C., indicating a minimal loss of temperature coefficient.

The sintered body with x=0.3 had a mean grain size of 0.9 $\mu$m, which was approximate to the single domain critical diameter (0.8 $\mu$m) for x=0.3.

Figure 6A:
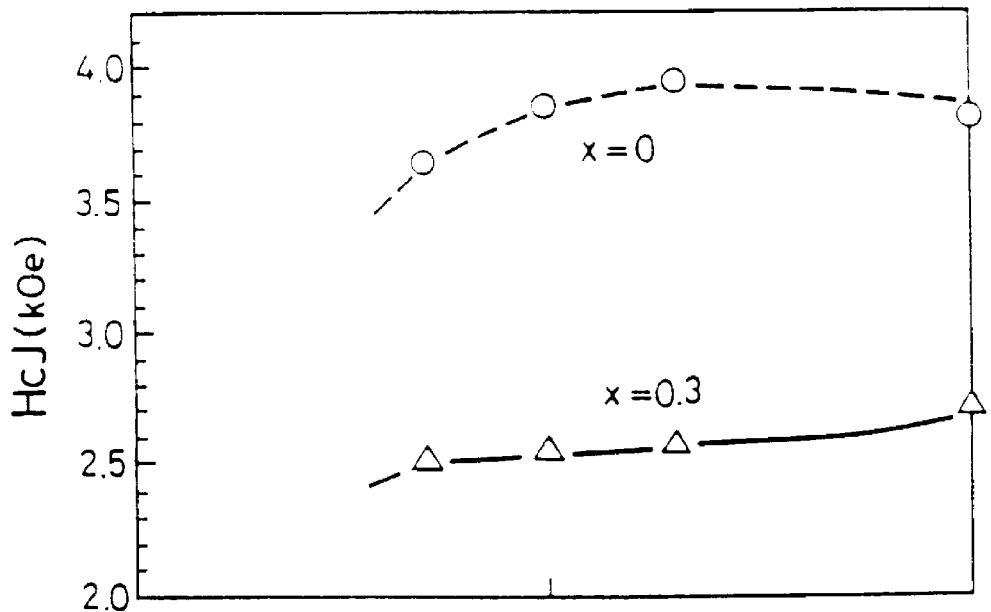
FIGS. 6A and 6B are graphs showing magnetic properties of a sintered body as a function of an oxygen partial pressure when a replacement ratio x of La and Zn is 0 or 0.3.
Figure 6B:
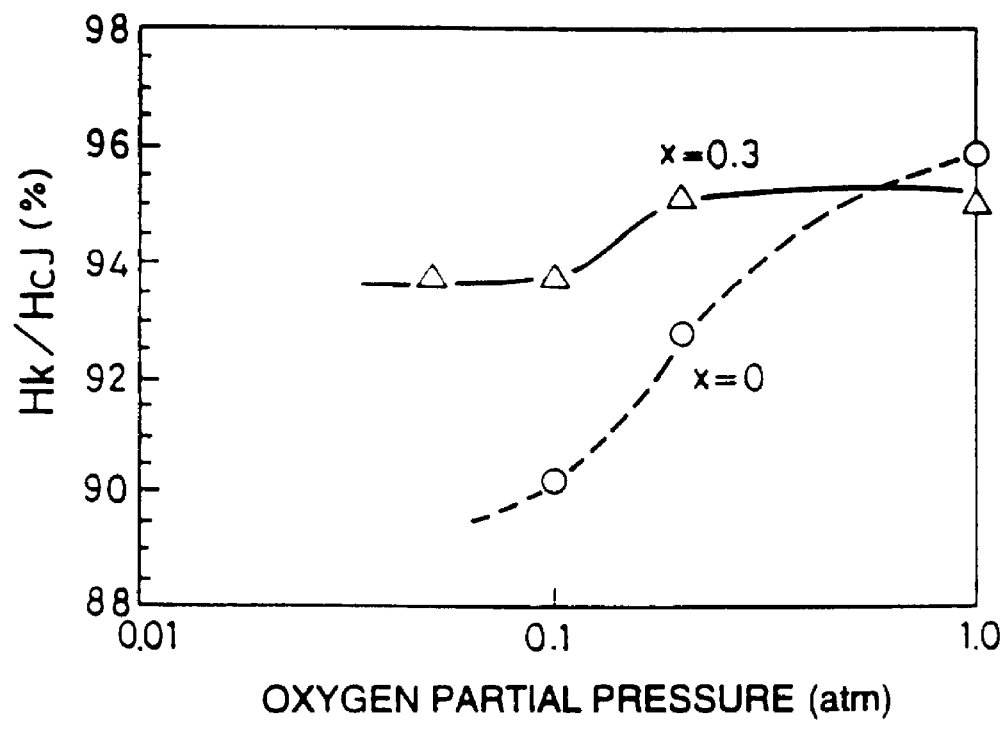
Figure 7A:
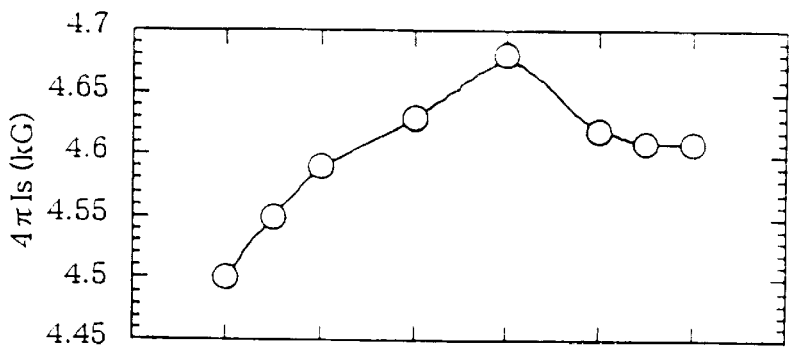
FIGS. 7A, 7B, 7C and 7D are graphs showing magnetic properties of a sintered body as a function of a replacement ratio x of La and Zn when a compact is fired under conditions optimum to provide the highest maximum energy product.
Figure 7B:
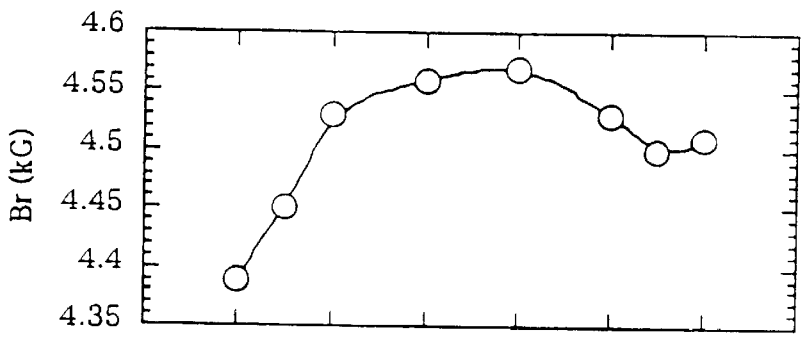
Figure 7C:
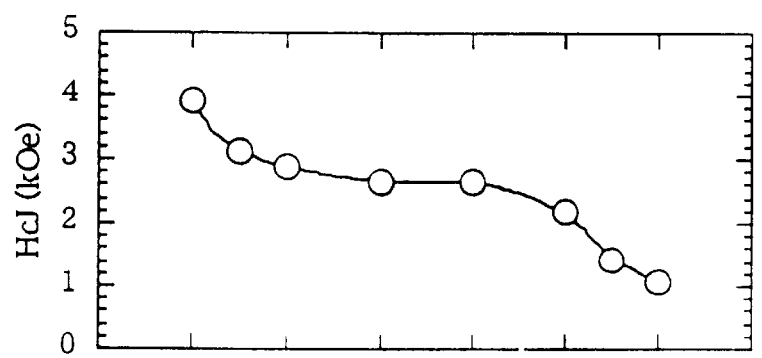
Figure 7D:
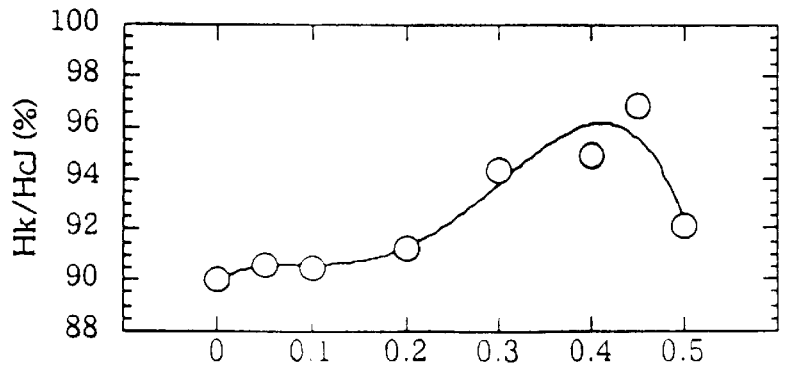

Also, sintered bodies were prepared under the conditions: replacement ratio x=0 or 0.3, firing temperature=1,210° C., and oxygen partial pressure=0.05 to 1 atm. in the firing atmosphere. Their magnetic properties were examined, with the results shown in FIG. 6. It is evident from FIG. 6 that the variations of HcJ and Hk/HcJ with an oxygen partial pressure at x=0.3 are smaller than those at x=0. This indicates that the replacement by La and Zn renders sintered magnets less sensitive to a change of the firing atmosphere.

Example 2-2

Sintered Magnet (Comparison in Terms of R-M Replacement Under Optimum Firing Conditions)

Calcined bodies were prepared as in Example 1 except that the raw materials were blended such that the primary phase would have the composition:

$Sr_{1-x}La_xFe_{12-x}Zn_xO_{19}$ wherein replacement ratio x=0, 0.05, 0.1, 0.2, 0.3, 0.4, 0.45, and 0.5. Sintered bodies were then prepared as in Example 2-1. Firing was done in air at a heating rate of 5° C./min. for one hour as in Example 2-1 while the maximum temperature was changed between 1,180° C. and 1,220° C. such that the maximum energy product (BH)max might be highest for each composition.

Figure 8:
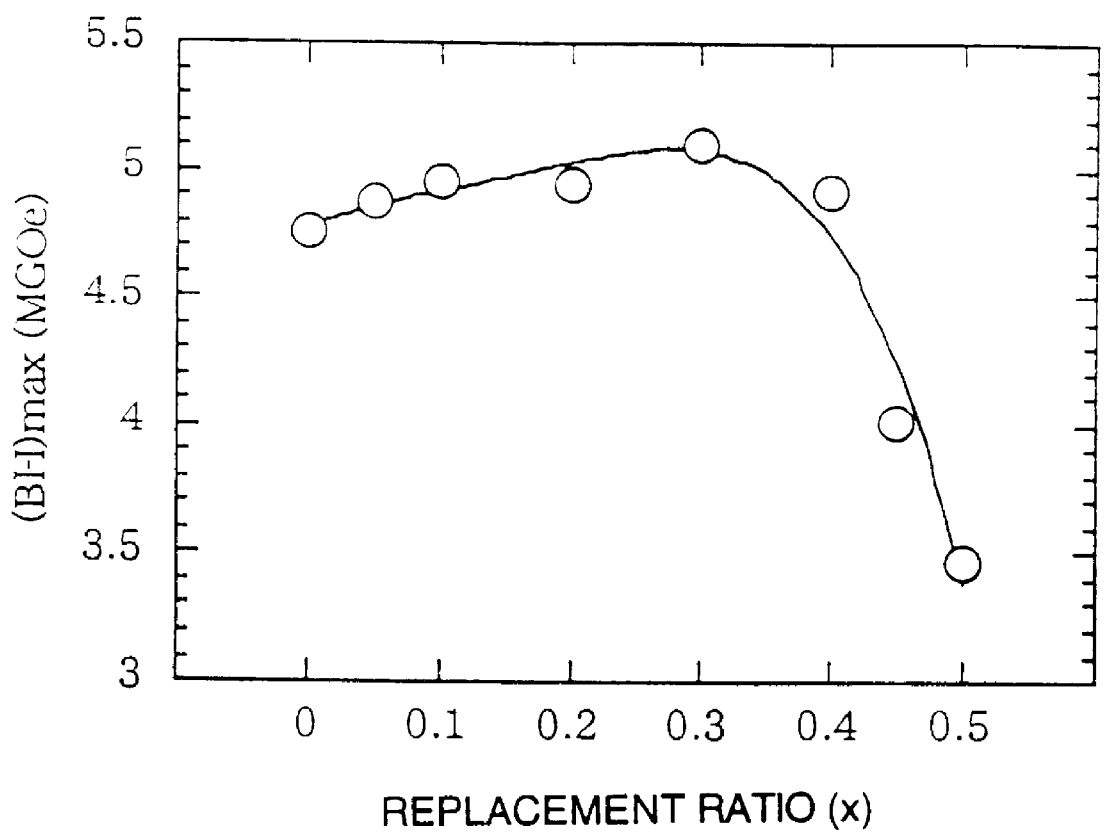
FIG. 8 is a graph showing the maximum energy product of a sintered body as a function of a replacement ratio x of La and Zn when a compact is fired under conditions optimum to provide the highest maximum energy product.

The sintered body was finished on the upper and lower surfaces before magnetic properties were measured. The results are shown in FIGS. 7 and 8. It is seen from FIGS. 7 and 8 that when the firing conditions are optimized, high saturation magnetization and high remanence, a reduced loss of HcJ, and a high squareness ratio Hk/HcJ are obtained in the replacement range of $0.05 \leq x \leq 0.45$. Although HcJ lowers as x increases, values of HcJ as demonstrated in the graph are satisfactory in the applications of magnets in speakers. and even motors, if an inverse magnetic field of not so high strength is applied, because higher Br is of importance in such applications. With a low replacement ratio of x=0.05 (or a minute quantity of replacement), a substantial rise of Br is observable.

It is understood that Hk is the strength of an external magnetic field when magnetization reaches 90% of the residual magnetization of a 4 πI-H magnetic hysteresis loop in the second quadrant. If Hk is low, the maximum energy product cannot be increased. Hk/HcJ is an index of magnet performance and represents a degree of squareness of a 4 πI-H magnetic hysteresis loop in the second quadrant. A sharp distribution of grain size leads to a high Hk/HcJ.

Figure 9:
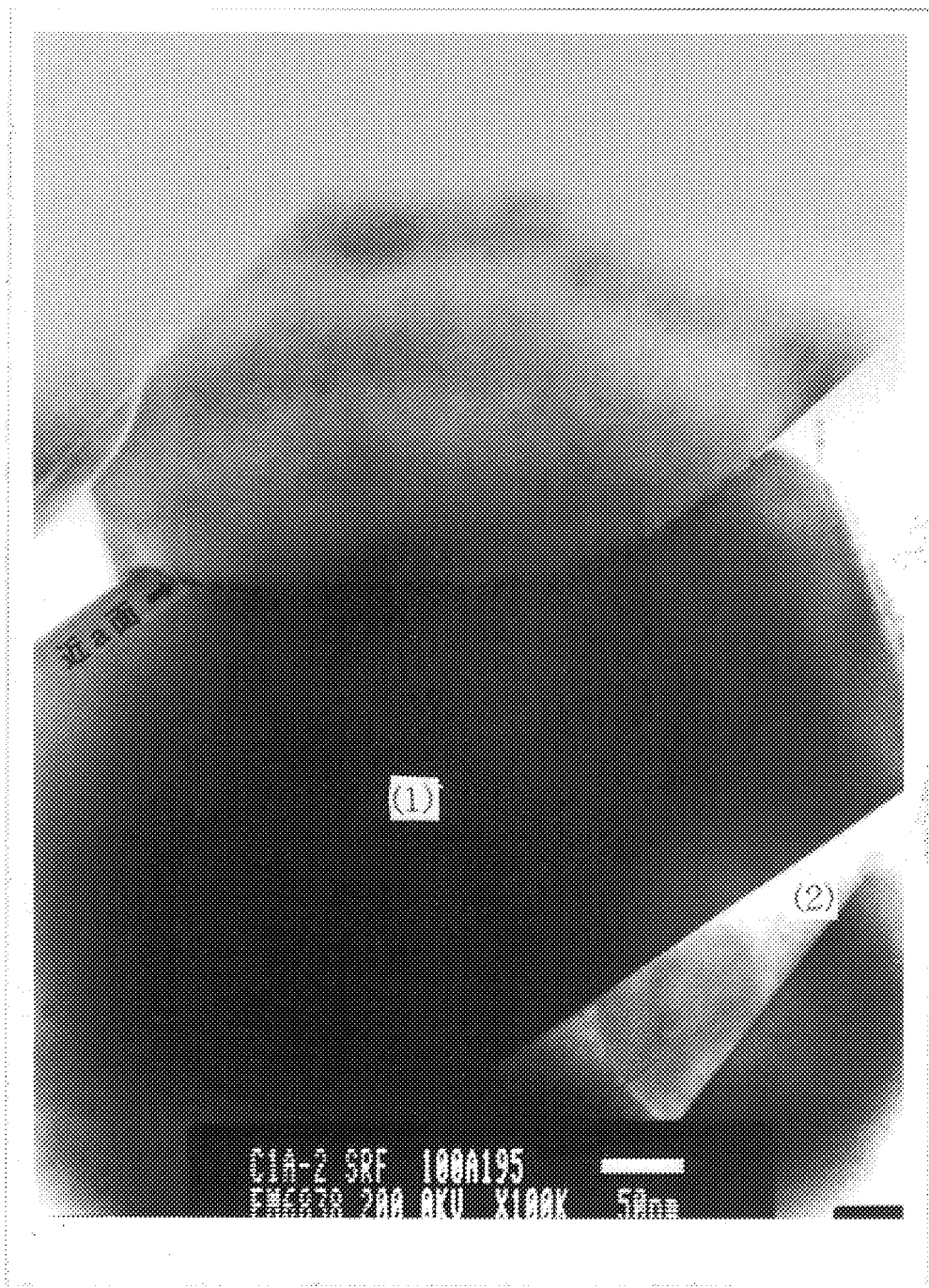
FIG. 9 is TEM photomicrograph of a sintered body, showing a grain structure.
Figure 10A:
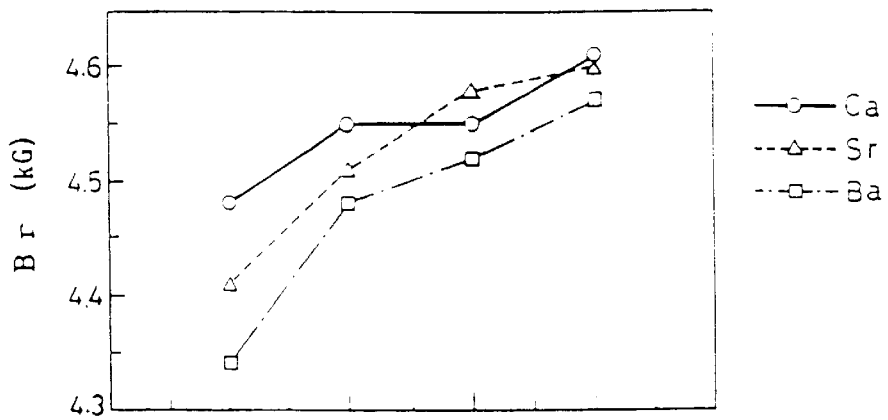
FIGS. 10A, 10B, 10C and 10D are graphs showing how magnetic properties of La-Zn substituted strontium ferrite magnet change when Si+ (Ca, Sr, Ba) are added.
Figure 10B:
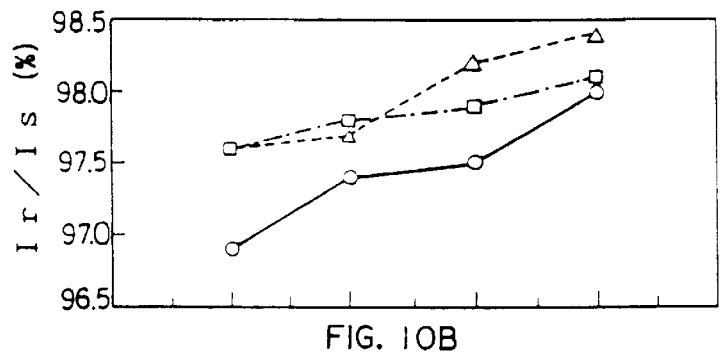
Figure 10C:
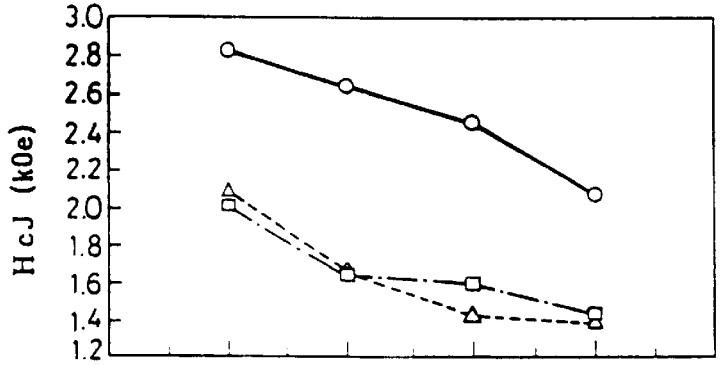
Figure 10D:
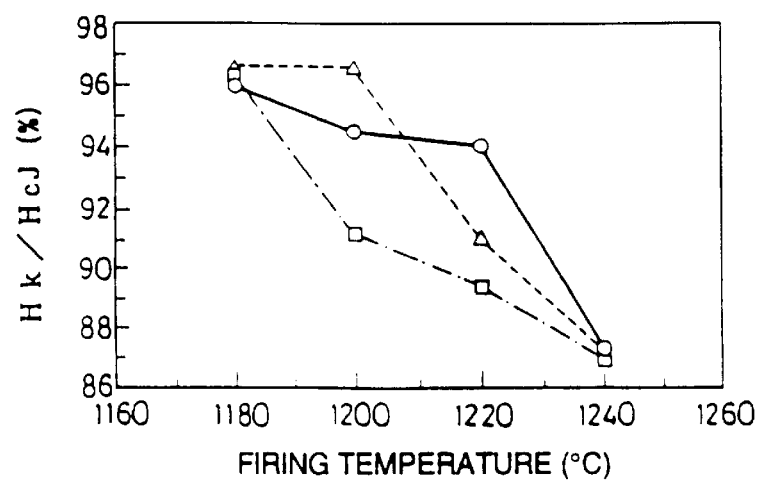
Figure 11A:
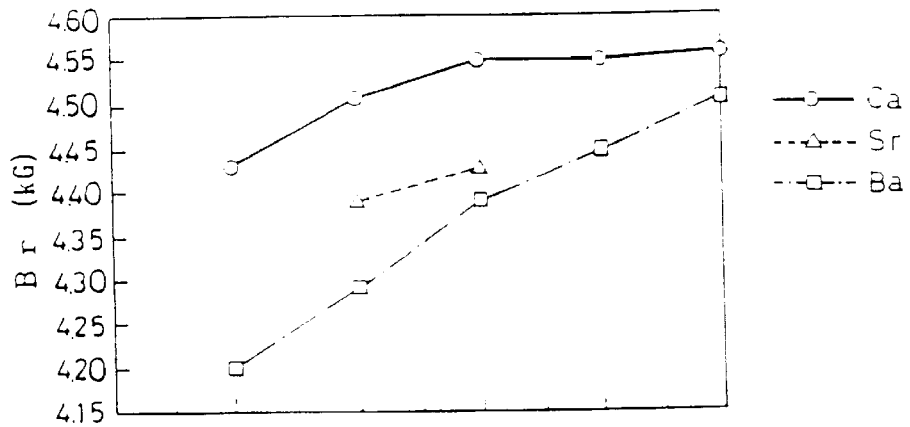
FIGS. 11A, 11B, 11C and 11D are graphs showing how magnetic properties of La-Zn substituted barium ferrite magnet change when Si+ (Ca, Sr, Ba) are added.
Figure 11B:
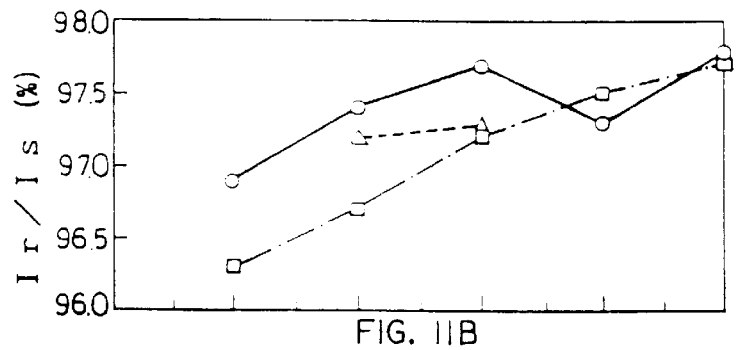
Figure 11C:
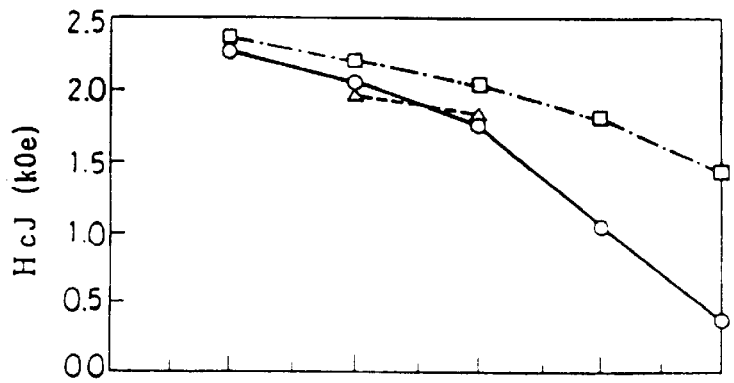
Figure 11D:
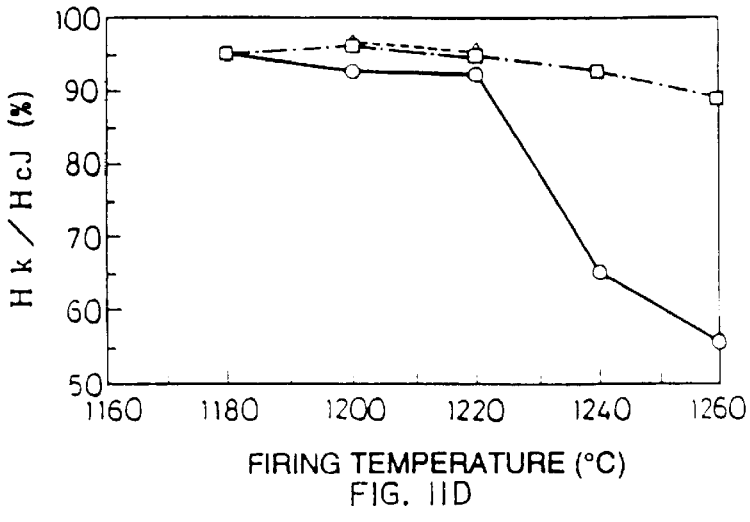

FIG. 9 is a photomicrograph through a transmission electron microscope (TEM) of a cross section of the sintered body having a primary phase composition of x=0.3 and fired at a maximum temperature of 1,220° C. In FIG. 9, a grain interior is labeled (1) and the grain boundary is labeled (2). The contents of elements at positions (1) and (2) were determined by TEM-EDS, with the results shown in Table 1.

TABLE 1

| Position | TEM-EDS quantitative analysis (at %) | | | | | |
|---|---|---|---|---|---|---|
| | Fe | Sr | Si | Ca | Zn | La |
| (1) interior | 33.8 | 2.3 | 1.4 | 0.1 | 0.5 | 1.4 |
| (2) boundary | 9.3 | 3.8 | 16.9 | 7.0 | 0.4 | 1.1 |

It is seen from Table 1 that La and Zn are not localized at the grain boundary, indicating the possibility that they replace other elements within crystal grains. It is also evident that Si and Ca are localized at the grain boundary.

Example 3

Sintered Magnet (Comparison in Terms of R)

Sintered magnets were prepared as in Example 2-1 except that the primary phase composition was changed to $$Sr_{0.7}R^{(3+)}{}_{0.3}Fe_{11.7}Zn_{0.3}O_{19}$$

wherein $R^{(3+)}$ is $La^{3+}$, $Pr^{3+}$ or $Nd^{3+}$ or $$Sr_{0.7}R^{(4+)}{}_{0.15}Fe_{11.7}Zn_{0.3}O_{19}$$

wherein $R^{(4+)}$ is $Ce^{4+}$ or $Pr^{4+}$. Their magnetic properties were determined, with the results shown in Table 2.

TABLE 2

| | R | Ionic radius (Å) | Br (kG) | HcB (kOe) | HcJ (kOe) | (BH)max (MGOe) | 4πIs (kG) | Ir/Is (%) | Hk/HcJ (%) | Density (g/cm³) |
|---|---|---|---|---|---|---|---|---|---|---|
| | $La^{3+}$ | 1.14 | 4.59 | 2.67 | 2.74 | 5.14 | 4.70 | 97.5 | 94.6 | 5.05 |
| Comparative Example | $Ce^{4+}$ | 0.92 | 4.12 | 2.96 | 3.03 | 4.16 | 4.24 | 97.3 | 91.8 | 5.00 |
| Comparative Example | $Pr^{3+}$ | 1.06 | 4.10 | 2.14 | 2.17 | 4.06 | 4.19 | 97.7 | 96.5 | 5.10 |
| Comparative Example | $Pr^{4+}$ | 0.90 | 4.42 | 1.87 | 1.89 | 4.56 | 4.51 | 97.9 | 95.7 | 5.05 |
| Comparative Example | $Nd^{3+}$ | 1.04 | 4.09 | 2.21 | 2.28 | 3.89 | 4.23 | 96.8 | 90.3 | 4.81 |

$Sr_{0.7}R^{(3+)}{}_{0.3}Fe_{11.7}Zn_{0.3}O_{19}$ ($R^{(3+)} = La^{3+}, Pr^{3+}, Nd^{3+}$)
$Sr_{0.7}R^{(4+)}{}_{0.15}Fe_{11.7}Zn_{0.3}O_{19}$ ($R^{(4+)} = Ce^{4+}, Pr^{4+}$)

It is evident from Table 2 that no satisfactory magnetic properties are obtained when lanthanum is not contained in element R.

Example 4

Sintered Magnet (Comparison in Terms of Additive Elements)

Calcined bodies were prepared as in Example 1 except that the primary phase composition was changed to $Sr_{0.7}La_{0.3}Fe_{11.7}Zn_{0.3}O_{19}$ or $Ba_{0.7}La_{0.3}Fe_{11.7}Zn_{0.3}O_{19}$. Sintered bodies were then prepared as in Example 2-1 except that additive elements were added to each calcined body in the following three combinations and the firing temperature was changed as shown in FIGS. 10 and 11.

Combination (1): $SiO_2$ 0.4 wt %+$CaCO_3$ 1.25 wt %
Combination (2): $SiO_2$ 0.4 wt %+$SrCO_3$ 1.85 wt %
Combination (3): $SiO_2$ 0.4 wt %+$BaCO_3$ 2.47 wt %

These sintered bodies were measured for magnetic properties, with the results shown in FIGS. 10 and 11. It is evident from these graphs that Sr and Ba ferrite sintered bodies exhibit a highest profile of magnetic properties when Si+Ca are added.

Example 5

Sintered Magnet (Combined Use of La with Another R)

Sintered bodies were prepared as in Example 2-1 except that crude lanthanum oxide, that is, lanthanum oxide of 70% purity (purity based on molar ratio: 68%, impurities: Nd and Pr) was used instead of $La_2O_3$ of 99.9% purity, and the raw materials were blended so as to provide a primary phase composition:

$Sr_{1-x}(La,Nd,Pr)_xFe_{12-y}Zn_yO_{19}$ wherein x=0.20, 0.25 or 0.30 and x/y=0.92. These sintered bodies had magnetic properties as shown in Table 3.

TABLE 3

| x | Br (kG) | HcB (kOe) | HcJ (kOe) | 4πIs (kG) | Ir/Is (%) | Hk/HcJ (%) | (BH)max (MGOe) |
|---|---|---|---|---|---|---|---|
| 0.20 | 4.52 | 2.64 | 2.80 | 4.61 | 98.1 | 90.4 | 5.01 |
| 0.25 | 4.50 | 2.51 | 2.60 | 4.58 | 98.1 | 92.4 | 4.91 |
| 0.30 | 4.53 | 1.95 | 2.03 | 4.61 | 98.3 | 86.2 | 4.65 |

$Sr_{1-x}(La, Nd, Pr)_xFe_{12-y}Zn_yO_{19}$ (x/y = 0.92)

It is evident from Table 3 that fully satisfactory magnetic properties are obtained when La is used in combination with another R. Specifically, Br is 4.5 kG or higher and HcJ reaches 2.8 kOe at maximum.

Example 6

Magnet Powder and Sintered Magnet (Comparison in Terms of La/Zn Ratio)

Calcined bodies and sintered bodies were prepared as in Example 1 and Example 2-1, respectively, except that the raw materials were blended so as to provide a primary phase composition:

$Sr_{0.8}La_{0.3+b}Fe_{11.8}Zn_{0.2}O_{19}$ wherein b=−0.05, −0.025, 0, 0.025, 0.05 or 0.10. The firing temperature was 1,200° C. or 1,220° C. These calcined bodies and sintered bodies had magnetic properties as shown in FIGS. 12 and 13.

Figure 12:
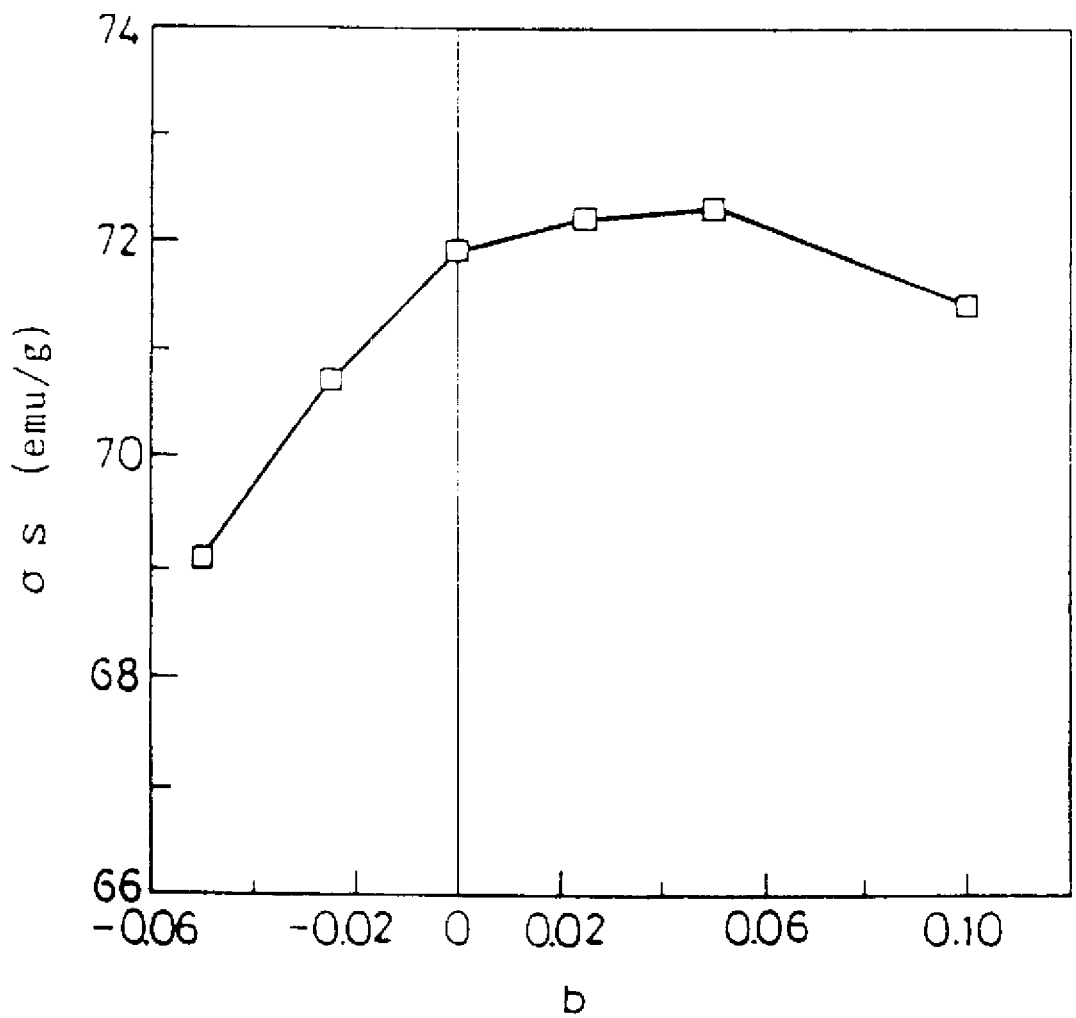
FIG. 12 is a graph showing magnetic properties as a function of b of a calcined body having the composition 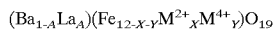 $Sr_{0.8}La_{0.2+b}Fe_{11.8}Zn_{0.2}O_{19}$.
Figure 13A:
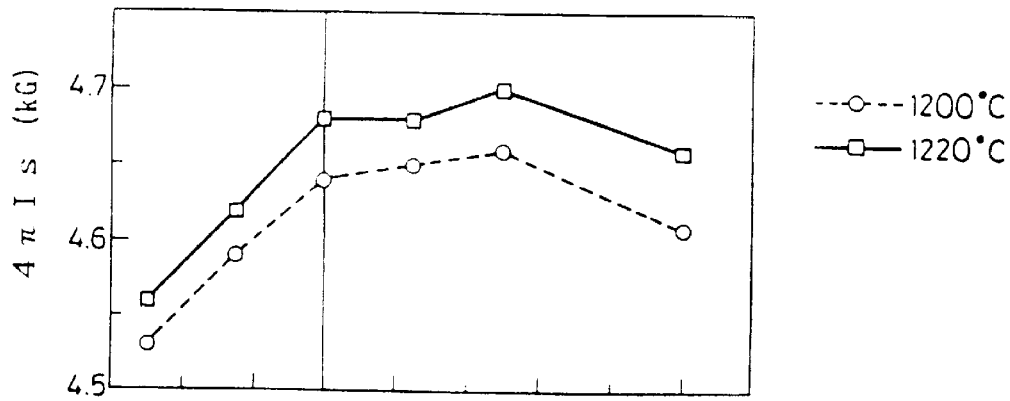
Figure 13B:
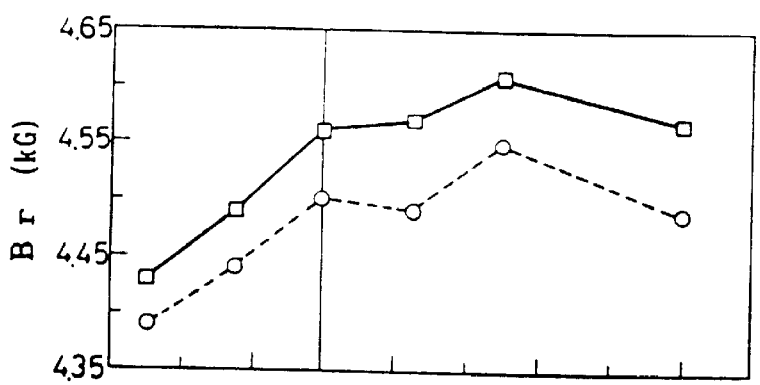
Figure 13C:
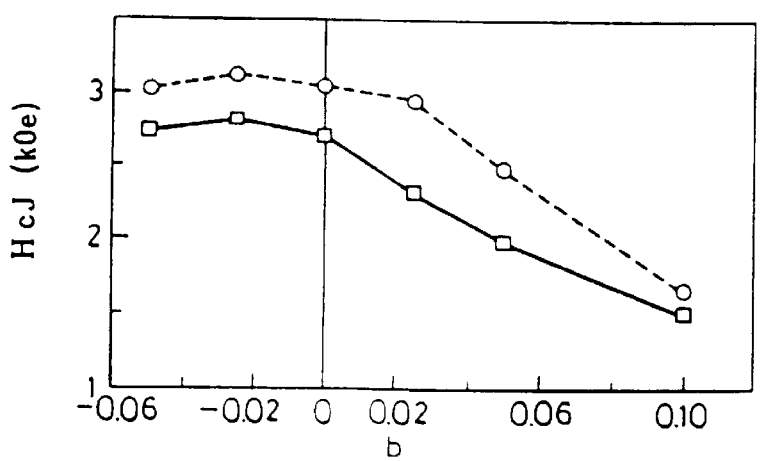

It is seen from FIGS. 12 and 13 that better magnetic properties are obtained when −0.025≦b≦0.10. When this is applied to the formula: $Sr_{1-x}La_x(Fe_{12-y}Zn_y)_zO_{19}$, x is from 0.18 to 0.27 (z is from 1.03 to 0.91) and y is 0.2. Better magnetic properties are obtained when 0.9≦x/y≦1.4.

Example 7

Magnet Powder ($B_2O_3$ Added)

Figure 14A:
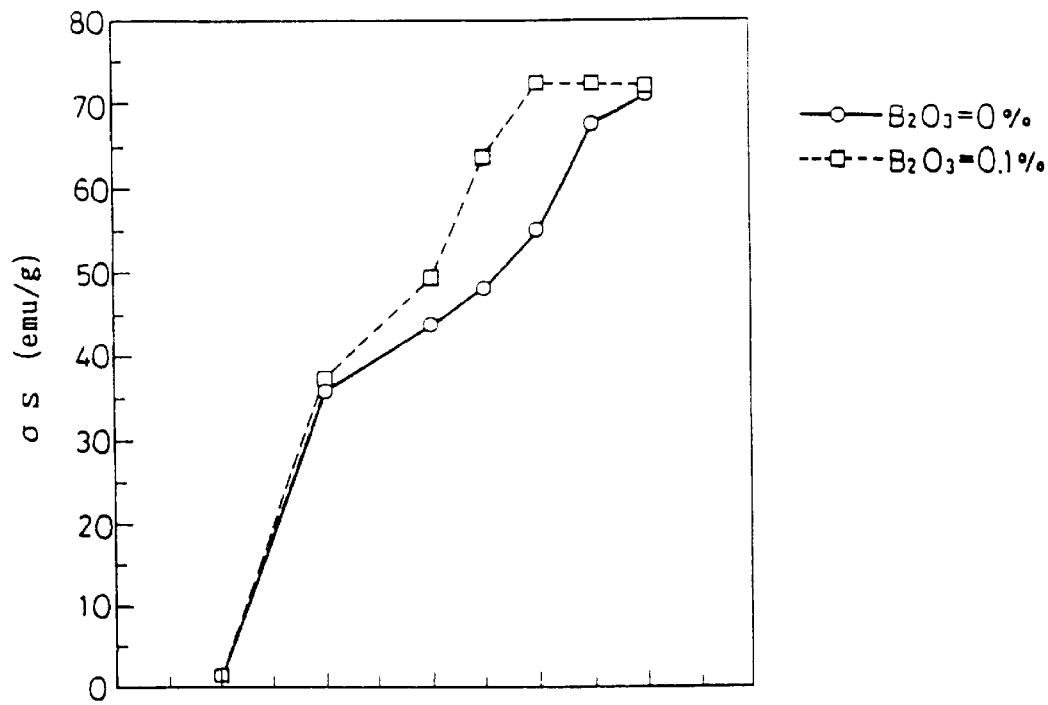
FIGS. 14A and 14B are graphs showing the influence of $B_2O_3$ on calcining temperature and magnetic properties.
Figure 14B:
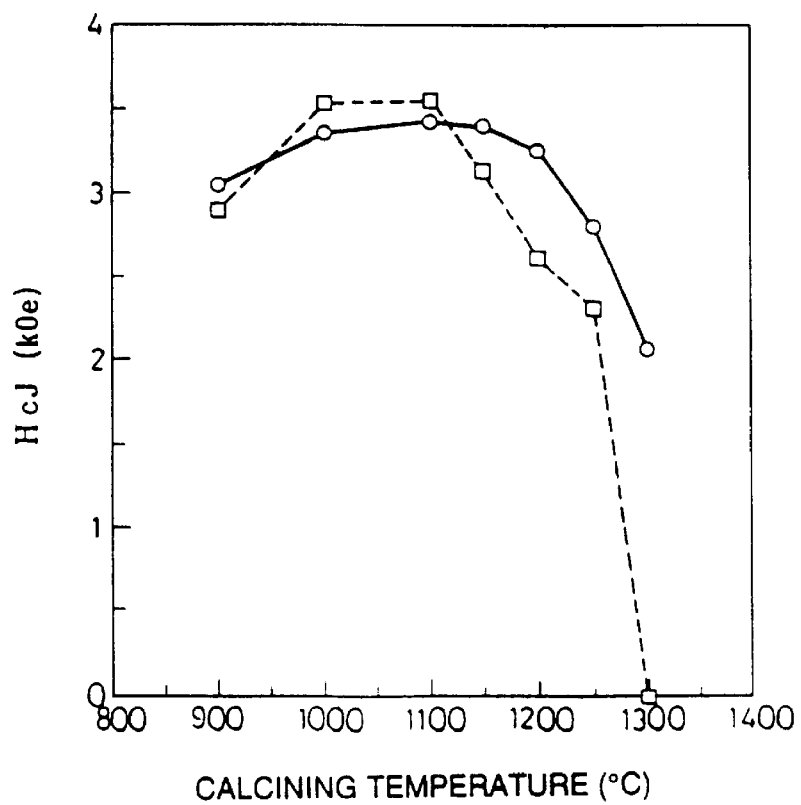

A calcined body was prepared as in Example 1 except that the raw materials were blended so as to provide a primary phase composition:

$Sr_{0.6}La_{0.4}Fe_{11.6}Zn_{0.4}O_{19}$, boron oxide $B_2O_3$ was added so as to give a content of 0.1% by weight, and the mixture was calcined at 900° to 1,300° C. For comparison purposes, a calcined body free of $B_2O_3$ was also prepared. These calcined bodies were measured for magnetic properties, with the results shown in FIG. 14. It is evident from FIG. 14 that the addition of $B_2O_3$ is effective for lowering the calcining temperature by about 100° C. This is probably because boron oxide is a low-melting substance.

Figure 15A:
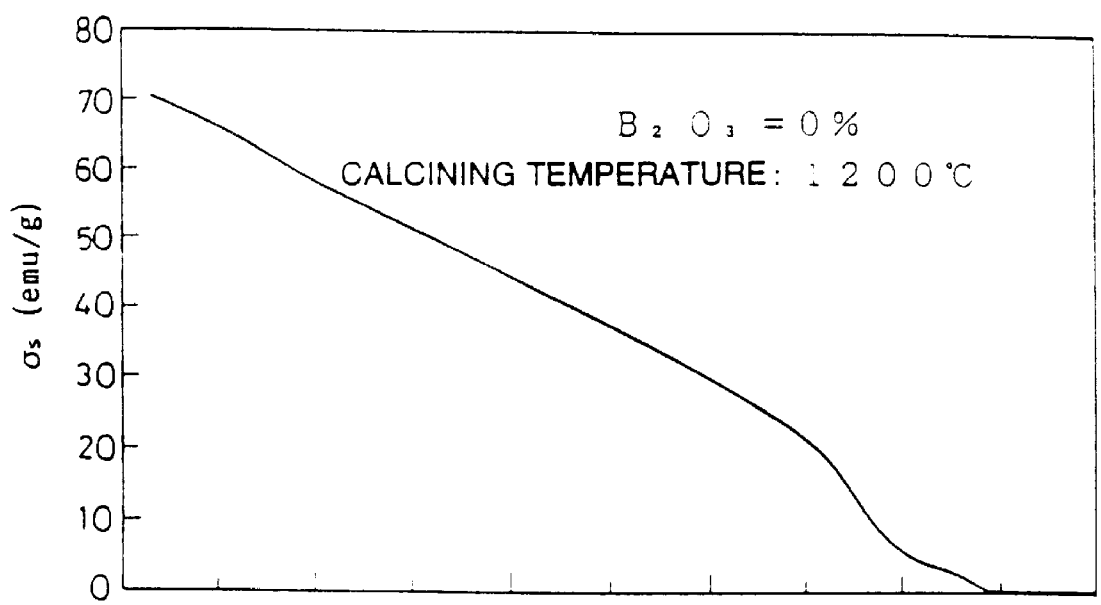
FIGS. 15A and 15B are graphs showing the influence of $B_2O_3$ on Curie temperature.
Figure 15B:
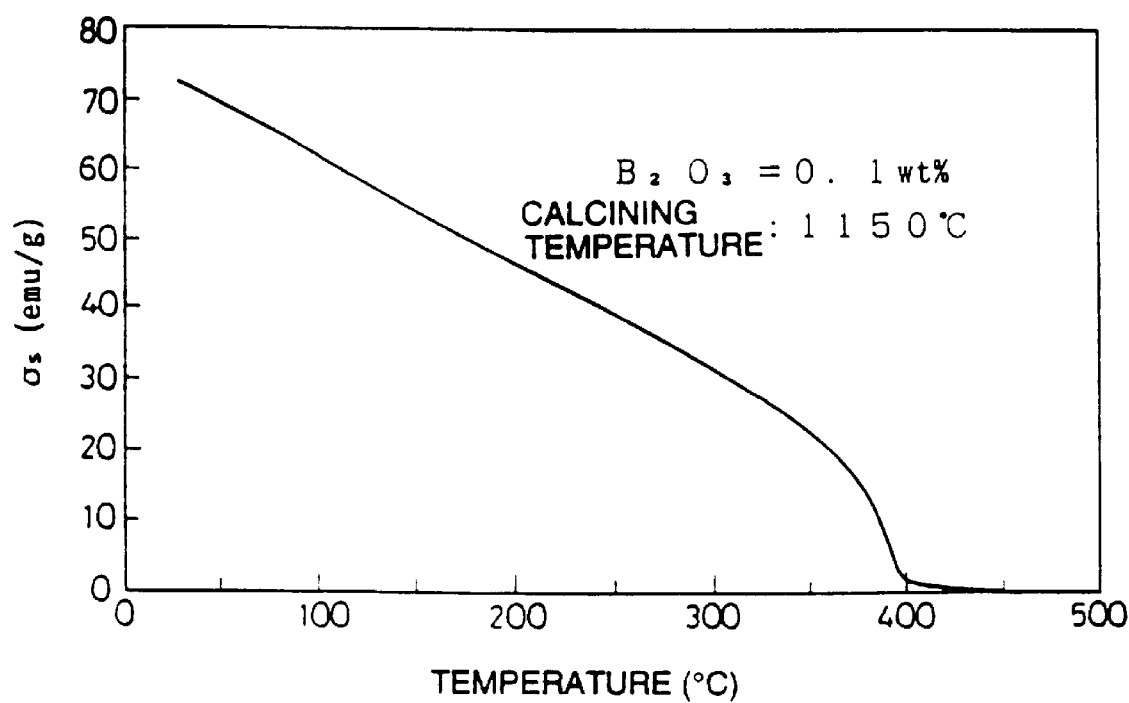

FIG. 15 shows temperature-magnetization curves of these calcined bodies. A comparison of the upper graph (free of $B_2O_3$) with the lower graph ($B_2O_3$ added) of FIG. 15 reveals that the higher Curie temperature substantially disappears as a result of addition of $B_2O_3$. This is probably because $B_2O_3$ added is effective for homogenizing the solid solution of La and Zn.

Example 8

Magnet Powder (Bi Added)

Figure 16A:
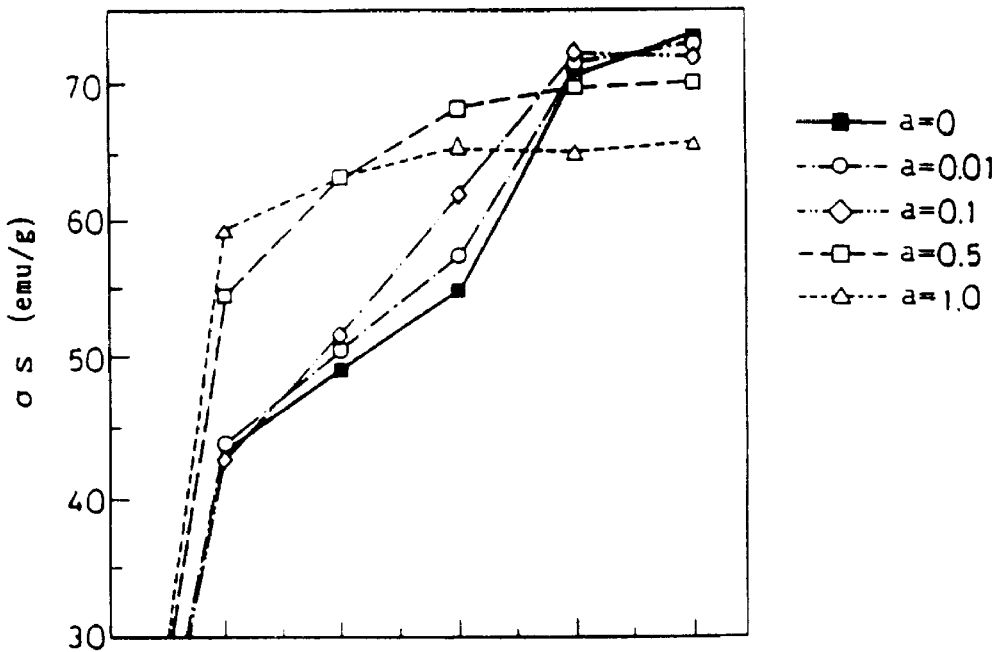
FIGS. 16A and 16B are graphs showing the influence of Bi on calcining temperature and magnetic properties.
Figure 16B:
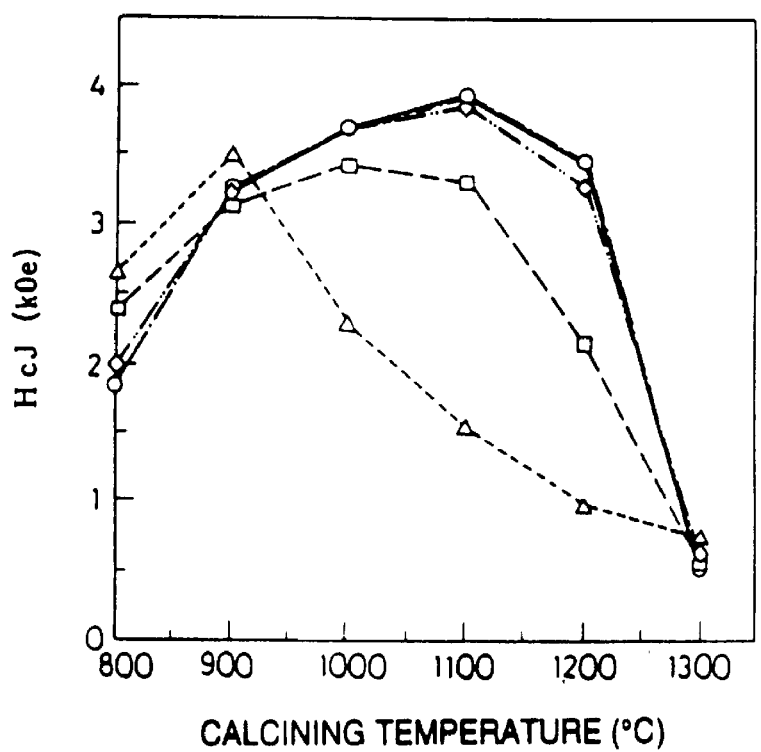
Figure 17:
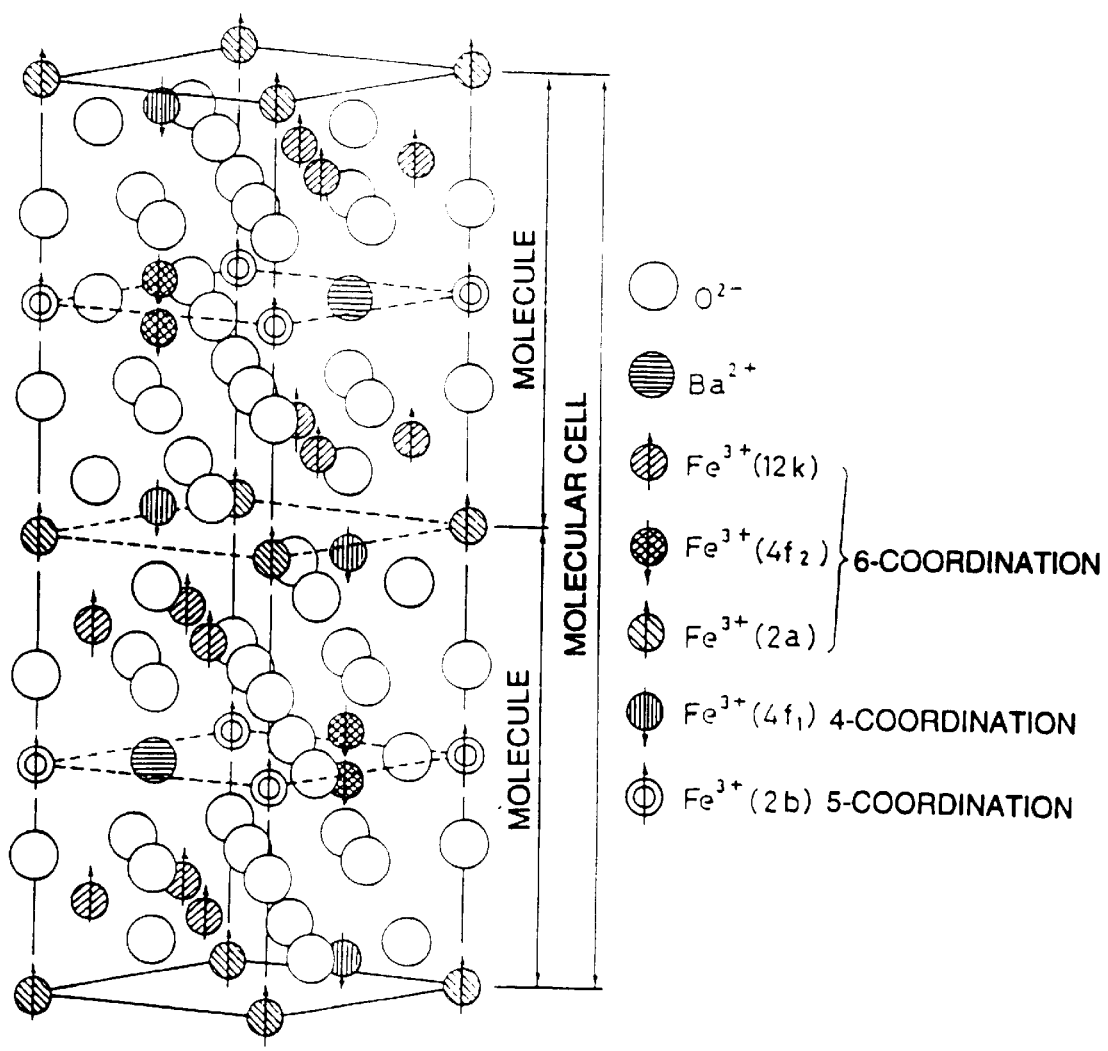
FIG. 17 diagrammatically illustrates the crystal structure of magnetoplumbite ferrite.

Calcined bodies were prepared as in Example 1 except that the raw materials were blended so as to provide a primary phase composition:

$Sr_{0.7}(La_{1-a}Bi_a)_{0.3}Fe_{11.7}Zn_{0.3}O_{19}$ wherein a ranges from 0 to 1, and the mixture was calcined at 800° to 1,300° C. These calcined bodies were measured for magnetic properties, with the results shown in FIG. 16. It is evident from FIG. 16 that the addition of bismuth is effective for lowering the calcining temperature. In particular, the addition of bismuth in the range of 0.01≦a ≦0.1 improves saturation magnetization as compared with the bismuth-free samples while causing little deterioration of coercivity.

Example 9

Magnet Powder and Sintered Magnet (Comparison in Terms of M)

Calcined bodies and sintered bodies were prepared as in Example 1 and Example 2-1, respectively, except that the raw materials were blended so as to provide a primary phase composition:

$Sr_{1-x}La_xFe_{12-x}M_xO_{19}$ wherein M is Zn or Mg and x=0 or 0.3 and the firing temperature was changed as shown in Table 4. These calcined bodies and sintered bodies had magnetic properties as shown in Table 4.

TABLE 4

| | | Calcined Body | | Firing | Sintered Body | | | | | | |
|---|---|---|---|---|---|---|---|---|---|---|---|
| M | x | σs (emu/g) | HcJ (kOe) | Temperature (°C.) | Br (kG) | HcB (kOe) | HcJ (kOe) | 4πIs (kG) | Ir/Is (%) | Hk/HcJ (%) | (BH)max (MGOe) |
| Zn | 0.3 | 72.4 | 3.30 | 1220 | 4.58 | 2.38 | 2.44 | 4.69 | 97.8 | 93.6 | 5.03 |
| Mg | 0.3 | 68.0 | 3.96 | 1220 | 4.36 | 2.65 | 2.73 | 4.46 | 97.8 | 92.8 | 4.63 |
| — | 0 | 71.0 | 5.20 | 1200 | 4.39 | 3.80 | 3.92 | 4.50 | 97.7 | 90.0 | 4.75 |

$Sr_{1-x}La_xFe_{12-x}M_xO_{19}$

It is evident form Table 4 that the use of magnesium as element M does not improve saturation magnetization and rather deteriorates magnetic properties as compared with the magnesium-free sample.

Equivalent results were obtained when cadmium was used instead of zinc in the foregoing Examples.

Moreover, calcined bodies and sintered bodies were prepared as in Example 1 and Example 2-1, respectively, except that the raw materials were dry blended so as to provide a primary phase composition:

$Sr_{1.3-2a}La_aM'_{a-0.3}Fe_{11.7}Zn_{0.3}O_{19}$ wherein M' is Na, K or Rb and 0.3<a<0.5 while the amount of evaporation during firing was taken into account. There were found magnetic properties equivalent to Examples 1 and 2-1.

Using the calcined bodies prepared in the foregoing Examples, bonded magnets were prepared. The bonded magnets showed similar results to the foregoing Examples having the corresponding replacement ratio x.

Magnetic cards were fabricated by forming on a substrate a coated magnetic layer containing each of the calcined bodies prepared in the foregoing Examples. The magnetic cards showed similar results to the foregoing Examples having the corresponding replacement ratio x. High outputs and high S/N were found when x was within the range of the invention.

Also, magnetic recording media were fabricated by sputtering the calcined body to form a thin film on a substrate, and heat treating the thin film to convert it into a hexagonal magnetoplumbite ferrite phase, thereby completing a thin film magnetic layer. The magnetic recording media showed similar results to the foregoing Examples having the corresponding replacement ratio x. High outputs and high S/N were found when x was within the range of the invention.

The effectiveness of the invention is evident from the foregoing example.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnet powder comprising a primary phase of hexagonal magnetoplumbite ferrite of the formula:

$$A_{1-x}R_x(Fe_{12-y}M_y)_zO_{19}$$

wherein A consists essentially of strontium and optionally at least one element selected from the group consisting of barium, calcium and lead, R consists essentially of lanthanum and optionally at least one element selected from the group consisting of yttrium, rare earth elements other than lanthanum, and bismuth, M is at least one element selected from zinc and cadmium, and letters x, y, and z representative of a molar ratio are in the range:

$0.04 \leq x \leq 0.45$, $0.04 \leq y \leq 0.45$, and $0.7 \leq z \leq 1.2$.

2. The magnet powder of claim 1 wherein $0.8 \leq x/y \leq 1.5$.

3. The magnet powder of claim 1 wherein R contains at least 40 atom % of lanthanum.

4. The magnet powder of claim 1 further comprising up to 0.5% by weight of $B_2O_3$.

5. The magnet powder of claim 1 having a saturation magnetization of at least 72 emu/g.

6. The magnet powder of claim 1 having a mean particle size of up to 1 μm.

7. A sintered magnet obtained by sintering the magnet powder of claim 1.

8. The sintered magnet of claim 7 having a remanence of at least 4.5 kG.

9. The sintered magnet of claim 7 having a mean grain size of up to 1 μm.

10. A bonded magnet comprising the magnet powder of claim 1.

11. A magnetic recording medium comprising the magnet powder of claim 1.

12. A magnetic recording medium comprising a thin film magnetic layer containing a hexagonal magnetoplumbite ferrite phase of the formula:

$$A_{1-x}R_x(Fe_{12-y}M_y)_zO_{19}$$

wherein A is at least one element selected from the group consisting of strontium, barium, calcium and lead, R consists essentially of lanthanum and optionally at least one element selected from the group consisting of yttrium, rare earth elements other than lanthanum, and bismuth, M is at least one element selected from zinc and cadmium, and letters x, y, and z representative of a molar ratio are in the range:

$0.04 \leq x \leq 0.45$, $0.04 \leq y \leq 0.45$, and $0.7 \leq z \leq 1.2$.

13. The magnetic powder of claim 1, wherein A is strontium.

14. The sintered magnet of claim 7, wherein A is strontium.

15. The magnetic recording medium of claim 12, wherein A consists essentially of strontium.

16. The sintered magnet of claim 8, wherein A is strontium.

17. The sintered magnet of claim 9, wherein A is strontium.

18. The bonded magnet of claim 10, wherein A is strontium.

19. The magnetic recording medium of claim 11, wherein A is strontium.

* * * * *